United States Patent
Lithoxoos et al.

(10) Patent No.: US 11,945,716 B2
(45) Date of Patent: Apr. 2, 2024

(54) ADSORPTION-BASED CLAUS TAIL GAS TREATMENT

(71) Applicant: Saudi Arabian Oil Company, Dhahran (SA)

(72) Inventors: Georgios Lithoxoos, Dhahran (SA); Sebastien A. Duval, Dhahran (SA); Rashid M. Othman, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 7 days.

(21) Appl. No.: 17/945,809

(22) Filed: Sep. 15, 2022

(65) Prior Publication Data
US 2023/0183066 A1 Jun. 15, 2023

(30) Foreign Application Priority Data
Dec. 15, 2021 (GR) .............................. 20210100882

(51) Int. Cl.
*C01B 17/04* (2006.01)
*B01D 53/00* (2006.01)

(52) U.S. Cl.
CPC ........ *C01B 17/0447* (2013.01); *B01D 53/002* (2013.01); *B01D 2257/304* (2013.01)

(58) Field of Classification Search
CPC ............ C01B 17/0447; C01B 17/0404; B01D 53/002; B01D 2257/304; B01D 53/1406; B01D 53/1418; B01D 53/1462; B01D 53/75; B01D 53/8612; B01D 2257/80; B01J 19/00; B01J 2219/00002
See application file for complete search history.

(56) References Cited

U.S. PATENT DOCUMENTS

| | | |
|---|---|---|
| 3,752,877 A | 8/1973 | Beavon |
| 3,824,766 A * | 7/1974 | Valentine ........... B01D 53/1493 95/163 |
| 4,001,386 A | 1/1977 | Klein et al. |
| 4,178,358 A | 12/1979 | Smith et al. |
| 5,023,069 A | 6/1991 | Serrand |
| 6,402,813 B2 | 6/2002 | Monereau et al. |
| 8,361,200 B2 | 1/2013 | Sayari et al. |
| 8,524,184 B2 | 9/2013 | Iyengar et al. |
| 8,551,199 B2 | 10/2013 | Thacker et al. |
| 8,551,229 B2 | 10/2013 | Hufton et al. |
| 9,149,761 B2 | 10/2015 | Northrop et al. |
| 9,731,974 B2 | 8/2017 | Weiss et al. |
| 10,188,988 B2 | 1/2019 | Debrock et al. |
| 10,662,061 B1 | 5/2020 | Lithoxoos et al. |
| 2004/0226441 A1 * | 11/2004 | Palmer ............... B01D 53/1456 423/228 |
| 2011/0185896 A1 | 8/2011 | Sethna et al. |
| 2011/0268650 A1 | 11/2011 | Lamar |
| 2013/0211171 A1 * | 8/2013 | Riemann ................... C07C 7/11 585/802 |
| 2013/0247766 A1 * | 9/2013 | Oppenheim ....... B01D 53/1425 96/234 |
| 2017/0190574 A1 | 7/2017 | Ercan et al. |
| 2020/0385274 A1 * | 12/2020 | Chow ................... B01D 53/18 |
| 2022/0242729 A1 | 8/2022 | Lithoxoos et al. |

FOREIGN PATENT DOCUMENTS

| | | | |
|---|---|---|---|
| CA | 2 461 952 C * | 9/2005 | ............... C10G 5/02 |
| EP | 1142628 | 10/2001 | |
| IN | 2015003855 | 1/2018 | |
| WO | WO 2017 023 856 A1 * | 2/2017 | ............. B01D 53/75 |
| WO | WO 2021130530 | 7/2021 | |

OTHER PUBLICATIONS

U.S. Appl. No. 17/166,821, filed Feb. 3, 2021, Lithoxoos et al.
Wahedi et al., "Economic assessment of Temperature Swing Adsorption systems as Claus Tail Gas Clean Up Units," Chemical Engineering Science, 2015, 126:186-195, 10 pages.
PCT Application No. PCT/IB2019/061417, Lithoxoos et al., "Regeneration Schemes for a Two Stage Adsorption Process for Claus Tail Gas Treatment," filed Dec. 28, 2019, 75 pages.
Petersen et al., "Fuel and CO2 Emission Reductions in Oil and Gas Refining Industry Thermal Oxidizers," American Flame Research Committee 2016 Industrial Combustion Symposium, 2016, 14 pages.
Powell et al., "Polymeric CO2/N2 gas separation membranes for the capture of carbon dioxide from power plant flue gases," Journal of Membrane Science, Aug. 2006, 279(1-2), 49 pages.
PCT International Search Report and Written Opinion in International Appln. No. PCT/US2022/052989, dated Aug. 1, 2023, 16 pages.

* cited by examiner

*Primary Examiner* — Timothy C Vanoy
(74) *Attorney, Agent, or Firm* — Fish & Richardson P.C.

(57) ABSTRACT

A method for sulfur recovery includes, in a hydrogenation reactor, converting sulfur-containing compounds in a Claus tail gas stream to hydrogen sulfide to produce a hydrogenated gas stream; feeding the hydrogenated gas stream to a quench tower to produce a quenched gas stream by condensing liquid water; feeding the quenched gas stream to a first stage adsorption vessel of a first stage adsorption unit to produce a first outlet gas stream by adsorbing water from the quenched gas stream; feeding the first outlet gas stream to a second stage adsorption vessel of a second stage adsorption unit to produce a second byproduct gas stream by adsorbing hydrogen sulfide from the first outlet gas stream; separating the second byproduct gas stream into a carbon dioxide stream and an enriched nitrogen stream; and regenerating the second stage adsorption vessel using the enriched nitrogen stream.

29 Claims, 11 Drawing Sheets

ADSORPTION-BASED CLAUS TAIL GAS TREATMENT

CROSS-REFERENCE TO RELATED APPLICATION

This application claims the benefit of priority to Greek Application No. 20210100882, filed on Dec. 15, 2021, the entire contents of which are incorporated by reference herein.

BACKGROUND

Sulfur recovery may refer to conversion of hydrogen sulfide to elemental sulfur. Hydrogen sulfide can be a byproduct of processing natural gas and refining sulfur-containing crude oils. The conventional method of sulfur recovery is the Claus process. A conventional Claus process can recover between 95% and 98% of hydrogen sulfide. The tail gas from the Claus process may have the remaining (residual) hydrogen sulfide, such as less than 5% of the hydrogen sulfide. The Claus tail gas can be treated to recover this remaining hydrogen sulfide.

SUMMARY

In an aspect, a method for sulfur recovery includes, in a hydrogenation reactor, converting sulfur-containing compounds in a Claus tail gas stream to hydrogen sulfide to produce a hydrogenated gas stream including hydrogen sulfide, water, and at least one of carbon dioxide or nitrogen; feeding the hydrogenated gas stream to a quench tower to produce a quenched gas stream by condensing liquid water into a water condensate stream; feeding the quenched gas stream to a first stage adsorption vessel of a first stage adsorption unit to produce a first outlet gas stream by adsorbing water from the quenched gas stream; feeding the first outlet gas stream to a second stage adsorption vessel of a second stage adsorption unit to produce a second byproduct gas stream by adsorbing hydrogen sulfide from the first outlet gas stream; separating at least a portion of the second byproduct gas stream into a carbon dioxide stream and an enriched nitrogen stream; and regenerating the second stage adsorption vessel by feeding a portion of the enriched nitrogen stream to the second stage adsorption vessel to produce a second outlet gas stream.

Embodiments can include one or any combination of two or more of the following features.

The method includes separating the first portion of the second byproduct gas stream into the carbon dioxide stream and the enriched nitrogen stream using cryogenic separation.

The method includes separating the first portion of the second byproduct gas stream into the carbon dioxide stream and the enriched nitrogen stream using a separation membrane. In some cases, the method includes applying vacuum to the separation membrane.

The method includes feeding the carbon dioxide stream to a thermal oxidizer. In some cases, the method includes feeding the carbon dioxide stream to the thermal oxidizer via an ejector.

The method includes regenerating the first stage adsorption vessel by feeding a first portion of the enriched nitrogen stream to the first stage adsorption vessel to produce a first byproduct gas stream by desorbing water. In some cases, the method includes joining the first byproduct gas stream with the hydrogenated gas stream to form a joined stream and feeding the joined stream to the quench tower.

The method includes heating the enriched nitrogen stream in a heat exchanger with heat from the hydrogenated gas stream.

The method includes pressurizing the quenched gas stream in a compressor; and cooling the pressurized quenched gas stream.

The method includes feeding the quenched gas stream to a collection drum to produce an adsorption feed by recovering liquid water via a second water condensate stream, in which the adsorption feed is fed to the first stage adsorption vessel.

The method includes feeding the water condensate stream to a sour water stripper.

The method includes feeding a second portion of the second byproduct gas stream to a thermal oxidizer.

The method includes feeding the second outlet gas to a reaction furnace.

In an aspect, a system for sulfur recovery from Claus tail gas includes a hydrogenation reactor configured to convert sulfur-containing compounds in a Claus tail gas stream to hydrogen sulfide to produce a hydrogenated gas stream; a quench tower fluidically connected to the hydrogenation reactor and configured to receive the hydrogenated gas stream and produce a quenched gas stream by condensing liquid water into a water condensate stream; a first stage adsorption unit including a first stage adsorption vessel that, during a first stage adsorption cycle, is fluidically connected to the quench tower and configured to receive the quenched gas stream and to produce a first outlet gas stream by adsorbing water from the quenched gas stream; a second stage adsorption unit including a second stage adsorption vessel that, during a second stage adsorption cycle, is fluidically connected to the first stage adsorption vessel and configured to receive the first outlet gas stream and to produce a second byproduct gas stream by adsorbing hydrogen sulfide from the first outlet gas stream; a carbon dioxide separation element configured to receive at least a portion of the second byproduct gas stream and to separate the portion of the second byproduct gas stream into a carbon dioxide stream and an enriched nitrogen stream; in which the second stage adsorption vessel, during a second stage regeneration cycle, is configured to receive a portion of the enriched nitrogen stream.

Embodiments can include one or any combination of two or more of the following features.

The carbon dioxide separation element includes a separation membrane configured to separate the portion of the second byproduct gas stream into the carbon dioxide stream and the enriched nitrogen stream.

The carbon dioxide separation element includes a cryogenic separation element.

The system includes a thermal oxidizer configured to receive the carbon dioxide stream. In some cases, the system includes an ejector, in which the thermal oxidizer is configured to receive the carbon dioxide stream from the ejector.

The first stage adsorption vessel, during a first stage regeneration cycle, is configured to receive a first portion of the enriched nitrogen stream and to produce a first byproduct gas stream by desorbing water.

The system includes a thermal oxidizer configured to receive a second portion of the second byproduct gas stream.

The system includes a reaction furnace fluidically connected to the second stage adsorption vessel and configured to receive a second outlet gas produced in the second stage adsorption unit during the second stage regeneration cycle.

The system includes a heat exchanger configured to cool the hydrogenated gas stream with heat from the enriched nitrogen stream.

The first stage adsorption vessel includes a hydrophilic molecular sieve.

The second stage adsorption vessel includes a Cu—Y type zeolite.

The first stage adsorption unit includes multiple first stage adsorption vessels fluidically connected in parallel, and in which the second stage adsorption unit includes multiple second stage adsorption vessels fluidically connected in parallel.

In an aspect a method for sulfur recovery includes, in a hydrogenation reactor, converting sulfur-containing compounds in a Claus tail gas stream to hydrogen sulfide to produce a hydrogenated gas stream including hydrogen sulfide, water, and at least one of carbon dioxide or nitrogen; feeding the hydrogenated gas stream to a quench tower to produce a quenched gas stream by condensing liquid water into a water condensate stream; feeding the quenched gas stream to a first stage adsorption vessel of a first stage adsorption unit to produce a first outlet gas stream by adsorbing water from the quenched gas stream; feeding the first outlet gas stream to a second stage adsorption vessel of a second stage adsorption unit to produce a second byproduct gas stream by adsorbing hydrogen sulfide from the first outlet gas stream; and regenerating the second stage adsorption vessel to produce a second outlet gas stream, in which regenerating the second stage adsorption vessel includes feeding a portion of the second byproduct gas stream and a stream of nitrogen to the second stage adsorption vessel.

Embodiments can include one or any combination of two or more of the following features.

Regenerating the second stage adsorption vessel includes feeding the stream of nitrogen to the second stage adsorption vessel from a cryogenic tank.

Regenerating the second stage adsorption vessel includes: feeding the portion of the second byproduct gas stream to the second stage adsorption vessel for a first period of time; and feeding the stream of nitrogen gas to the second stage adsorption vessel for a second period of time following the first period of time.

The details of one or more implementations are set forth in the accompanying drawings and the description below. Other features and advantages will be apparent from the description and drawings, and from the claims.

DETAILED DESCRIPTION

We describe here approaches to regeneration of hydrogen sulfide adsorption vessels in a Claus tail gas treatment system that facilitate a high level of sulfur recovery. In some approaches, a two-phase process is employed for regeneration of a hydrogen sulfide adsorption vessel. In the first phase, a slip stream of clean gas including carbon dioxide and nitrogen is fed into the hydrogen sulfide adsorption vessel to desorb hydrogen sulfide from the adsorbent material therein. The feed of clean gas is then stopped, and a stream of high purity nitrogen is fed into the hydrogen sulfide adsorption vessel for further regeneration. In some approaches, the slip stream of clean gas is separated, e.g., by a separation membrane, into a stream of carbon dioxide and a stream of nitrogen, and then nitrogen stream is directed into the hydrogen sulfide adsorption vessel for regeneration. The carbon dioxide stream can be fed into a thermal oxidizer.

These approaches to regeneration of adsorbent in a Claus tail gas treatment system can help to avoid the occurrence of hydrogen sulfide spikes during adsorbent regeneration. In addition, these approaches can facilitate a high level of sulfur recovery, e.g., greater than 99%, greater than 99.5%, greater than 99.9%, or greater than 99.95% sulfur recovery, with recovered hydrogen sulfide being recycled to the Claus feed gas.

Figure 1:
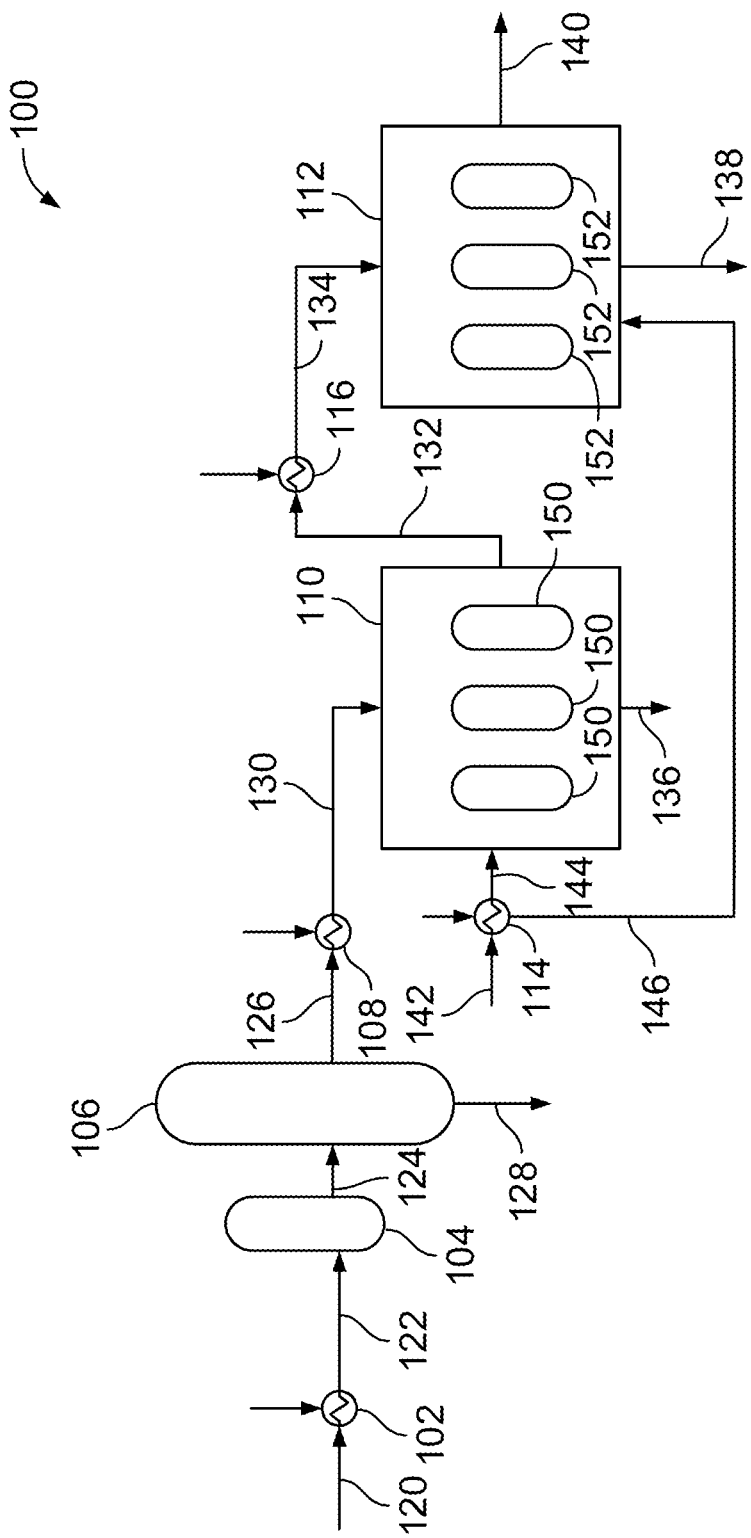
FIGS. 1-6 are diagrams of systems for Claus tail gas treatment.

FIG. 1. shows a schematic diagram of a system 100 for Claus tail gas treatment. Additional description of Claus tail gas treatment processes and systems can be found in U.S. Pat. No. 10,662,061, the contents of which are incorporated here by reference in their entirety. The system 100 includes a first heat exchanger 102, a hydrogenation reactor 104, a quench tower 106, a second heat exchanger 108, a first stage adsorption unit 110, a second stage adsorption unit 112, a third heat exchanger 114, and a fourth heat exchanger 116.

A tail gas stream 120 is heated in the first heat exchanger 102 to produce a heated tail gas stream 122. The heated tail gas stream 122 is introduced to the hydrogenation reactor 104 to produce a hydrogenated gas stream 124. The hydrogenated gas stream 124 is introduced to the quench tower 106 to produce a quenched gas stream 126 and a water condensate stream 128. The quenched gas stream 126 is cooled in the second heat exchanger 108 to produce a cooled quenched gas stream 130. The cooled quenched gas stream 130 is introduced to the first stage adsorption unit 110 to produce a first outlet gas stream 132 and a first byproduct stream 136. The first outlet gas stream 132 is cooled in the fourth heat exchanger 116 to produce a cooled first outlet gas stream 134. The cooled first outlet gas stream 134 is introduced to the second stage adsorption unit 112 to produce a second outlet gas stream 140 and a second byproduct stream 138.

In some examples, e.g., as shown in FIG. 1, a gas feed 142 is heated in the third heat exchanger 114 to produce a first regeneration gas stream 144 and a second regeneration gas stream 146. The feed 142 can be air (as shown) or relatively clean gas including carbon dioxide and nitrogen. The first regeneration gas stream 144 is introduced to the first stage adsorption unit 110. The second regeneration gas stream 146 is introduced to the second stage adsorption unit 112.

The tail gas stream 120 includes a Claus tail gas that includes sulfur-containing compounds, e.g., sulfur-containing compounds that were not fully recovered by an upstream Claus unit. The sulfur-containing compounds can exist in forms such as elemental sulfur, hydrogen sulfide, sulfur oxides, and anionic counterparts of the same. As used herein, the term "elemental sulfur" refers to all phases of sulfur, which can exist in the forms such as S, $S_2$, $S_3$, $S_4$, $S_5$, $S_6$, $S_7$, and $S_8$. Non-limiting example sulfur oxides include SO, $SO_2$, $SO_3$, $SO_4$, $S_2O$, $S_2O_2$, $S_6O$, $S_6O_2$, $S_7O$, $S_7O_2$, $S_8O$, $S_9O$, and $S_{10}O$. The Claus tail gas in the tail gas stream 120 can also include carbon dioxide, water, nitrogen, hydrogen, and combinations of the same.

The first heat exchanger 102 can be any heat exchanger capable of heating a gas stream to a temperature at which hydrogenation reactions can occur in the hydrogenation reactor 104. The first heat exchanger 102 can heat the tail gas stream 120 such that the heated tail gas stream 122 has a temperature between about 200° C. and about 300° C., e.g., between about 220° C. and about 280° C., or between about 240° C. and about 260° C., e.g., about 250° C. After heating, the heated tail gas stream 122 still includes the sulfur-containing compounds, carbon dioxide, water, nitrogen, hydrogen, and combinations of the same described above for the tail gas stream 120.

The hydrogenation reactor 104 can be any reactor, catalytic or non-catalytic, capable of reducing the sulfur-containing compounds in the heated tail gas stream 122 other than hydrogen sulfide to hydrogen sulfide. In some examples, hydrogen included in the heated tail gas stream 122 is used for reducing the sulfur-containing compounds in the heated tail gas stream 122 to hydrogen sulfide. In some examples, a make-up hydrogen gas stream (not shown) is introduced to the hydrogenation reactor 104. In some examples, water is produced as a byproduct during the hydrogenation reaction. As a result, the hydrogenated gas stream 124 includes sulfur-containing compounds of substantially hydrogen sulfide only. The hydrogenated gas stream 124 can also include carbon dioxide, water, nitrogen, and combinations of the same.

The quench tower 106 can be any apparatus capable of condensing and recovering water from the hydrogenated gas stream 124. A significant portion of water included in the hydrogenated gas stream 124 is condensed and substantially recovered via the water condensate stream 128. Although a significant portion of water included in hydrogenated gas stream 124 is removed, the quenched gas stream 126 output from the quench tower 106 can still include residual amounts of gas phase water. For instance, the quenched gas stream 126 can have a gas phase water content ranging between about 0 mol % and about 20 mol %, e.g., between about 3 mol % and about 15 mol %, or between about 4 mol % and about 10 mol %, e.g., about 8 mol %. The quenched gas stream 126 can also include hydrogen sulfide (such as the hydrogen sulfide preexisting in the Claus tail gas, hydrogen sulfide produced in hydrogenation reactor 104, or both), carbon dioxide, nitrogen, and combinations of the same. The quenched gas stream 126 has a temperature ranging between about 20° C. and about 170° C., e.g., between about 30° C. and about 100° C., or between about 40° C. and about 80° C., e.g., about 43° C.

The second heat exchanger 108 can be any heat exchanger capable of cooling a gas stream to a temperature at which adsorption occurs in the first stage adsorption unit 110. The second heat exchanger 108 can cool quenched gas stream 126 such that the cooled quenched gas stream 130 has a temperature ranging between about 0° C. and about 70° C., e.g., between about 10° C. and about 40° C., or between about 15° C. and about 30° C., e.g., about 21° C. As the quenched gas stream 126 is cooled, the gas phase water content of the cooled quenched gas stream 130 reduces to a range between about 0 mol % and about 10 mol %, e.g., between about 0 mol % and about 5 mol %, or between about 0 mol % and about 1 mol %, e.g., about 0.46 mol %. The cooled quenched gas stream 130 can include hydrogen sulfide (such as the hydrogen sulfide preexisting in the Claus tail gas, hydrogen sulfide produced in hydrogenation reactor 104, or both), carbon dioxide, water, nitrogen, and combinations of the same.

The first stage adsorption unit 110 includes one or more first stage adsorption vessels 150 fluidly connected in series or parallel. Each of the one or more first stage adsorption vessels 150 is filled with a first adsorbent.

In some examples, the first adsorbent includes any adsorbent capable of selectively capturing hydrogen sulfide while generally rejecting water from a wet gas stream (such as the cooled quenched gas stream 130). Non-limiting example materials used for the first adsorbent include all-silica zeolites having a framework such as an MFI type or a CHA type. The all-silica zeolites are hydrophobic materials that can be used to separate polar molecules such as water from lesser polar molecules such as hydrogen sulfide, carbon dioxide, and nitrogen. During an adsorption cycle, components of the cooled quenched gas stream 130 are introduced through one or more first stage adsorption vessels 150 of first stage adsorption unit 110. Components of the cooled quenched gas stream other than water (e.g., hydrogen sulfide) are captured in the pores of the first adsorbent. Water passes through the first adsorbent and is subsequently collected via the first byproduct stream 136. During a regeneration cycle, components of the first regeneration gas stream 144 enter the one or more first stage adsorption vessels 150 to regenerate the first adsorbent. Desorption occurs in the one or more first stage adsorption vessels 150, where the first adsorbent releases the captured hydrogen sulfide to produce the first outlet gas stream 132 substantially in the absence of water.

In some examples, the first adsorbent includes any adsorbent capable of selectively capturing water form a wet gas stream (such as the cooled quenched gas stream 130) while generally rejecting hydrogen sulfide. Non-limiting example materials used for the first adsorbent include molecular sieves, such as hydrophilic 3A molecular sieves described in U.S. Pat. No. 9,701,537, the contents of which are incorporated here by reference in their entirety. During an adsorption cycle, components of the cooled quenched gas stream 130 are introduced through the one or more first stage adsorption vessels 150 of the first stage adsorption unit 110. Water (and relatively small amount of hydrogen sulfide) is captured in the pores of the first adsorbent. Components other than water (e.g., hydrogen sulfide, carbon dioxide, and nitrogen) pass through the first adsorbent to produce the first outlet gas stream 132 substantially in the absence of water. During a regeneration cycle, components of the first regeneration gas stream 144 enter the one or more first stage adsorption vessels 150 to regenerate the first adsorbent. Desorption occurs in the one or more first stage adsorption vessels 150, where the first adsorbent releases the captured water (and relatively small amount of hydrogen sulfide) which is collected via the first byproduct stream 136.

In some examples, first stage adsorption unit 110 includes at least three first stage adsorption vessels 150 fluidly connected in a parallel manner. At any given moment during operation, one of the at least three first stage adsorption vessels 150 is conducting the adsorption cycle, one of the at least three first stage adsorption vessels 150 is conducting the regeneration cycle, and one of the at least three first stage adsorption vessels 150 is standing by. In this manner, components of the cooled quenched gas stream 130 can be continuously fed to the first stage adsorption unit 110 and a continuous flow of the first outlet gas stream 132 can be produced from the first stage adsorption unit 110.

The fourth heat exchanger 116 can be any heat exchanger capable of cooling a gas stream to a temperature at which adsorption occurs in the second stage adsorption unit 112. The fourth heat exchanger 116 can cool first outlet gas stream 132 such that the cooled first outlet gas stream 134 has a temperature between about 0° C. and about 70° C., e.g., between about 10° C. and about 40° C., or between about 15° C. and about 30° C., e.g., about 25° C. The first outlet gas stream 132 can include hydrogen sulfide, carbon dioxide, nitrogen, and combinations of the same, all of which are products of the first stage adsorption unit 110.

The second stage adsorption unit 112 includes one or more second stage adsorption vessels 152 fluidly connected in a serial or parallel manner. Each of the one or more second stage adsorption vessels 152 is filled with a second adsorbent. In some examples, the second adsorbent can include any adsorbent capable of selectively capturing hydrogen sulfide while rejecting carbon dioxide and nitrogen. In some embodiments, the second adsorbent can include any adsorbent having differences in breakthrough time between hydrogen sulfide and carbon dioxide, and between hydrogen sulfide and nitrogen. Non-limiting example materials used for the second adsorbent include molecular sieves (e.g., molecular sieve 4A, etc.); hydrophobic zeolites having a framework such as an MFI type, a CHA type, an FAU type, an MOR type, a DDR type, an FER type, or an MWW type; and hydrophobic zeolites such as MOFs or ZIFs.

During an adsorption cycle, components of the cooled first outlet gas stream 134 are introduced through the one or more second stage adsorption vessels 152 of the second stage adsorption unit 112. Hydrogen sulfide is captured in the pores of the second adsorbent. Components other than hydrogen sulfide (e.g., carbon dioxide and nitrogen) pass through the second adsorbent and are subsequently collected via the second byproduct stream 138. During a regeneration cycle, components of the second regeneration gas stream 146 enter the one or more second stage adsorption vessels 152 to regenerate the second adsorbent. Desorption occurs in the one or more second stage adsorption vessels 152, where the second adsorbent releases the captured hydrogen sulfide to produce the second outlet gas stream 140 substantially in the absence of carbon dioxide and nitrogen.

In some examples, second stage adsorption unit 112 includes at least three second stage adsorption vessels 152 fluidly connected in a parallel manner. At any given moment during operation, one of the at least three second stage adsorption vessels 152 is conducting the adsorption cycle, one of the at least three second stage adsorption vessels 152 is conducting the regeneration cycle, and one of the at least three second stage adsorption vessels 152 is standing by. In this manner, components of the cooled first outlet gas stream 134 can be continuously fed to the second stage adsorption unit 112 and a continuous flow of the second outlet gas stream 140 can be produced from the second stage adsorption unit 112.

The gas feed 142 can be an air feed of any oxygen-containing gas suitable as regeneration gas for regenerating adsorbent materials. Non-limiting example gases for use as the gas feed 142 include air, oxygen-enriched air, pure oxygen, and combinations of the same. In some examples, air feed 142 is air. Gases in lieu of or in addition to air feed 142 can be employed as the regeneration gas. For instance, the regeneration gas can include at least one of nitrogen or carbon dioxide.

The third heat exchanger 114 can be any heat exchanger (e.g., shell-and-tube heat exchanger, plate type heat exchanger, etc.) capable of heating a gas stream to a temperature at which adsorbent regeneration occurs in each of the first stage adsorption unit 110 and the second stage adsorption unit 112. The third heat exchanger 114 can heat the air feed 142 such that each of the first regeneration gas stream 144 and the second regeneration gas stream 146 has a temperature between about 150° C. and about 350° C., e.g., between about 200° C. and about 300° C., or between about 230° C. and about 290° C., e.g., about 260° C.

The second outlet gas stream 140 includes hydrogen sulfide. The second outlet gas stream 140 has a hydrogen sulfide content of at least about 95 wt. %, e.g., at least about 98 wt. %, or at least about 99 wt. %. In some examples, the second outlet gas stream 140 is used as a feed gas for the Claus unit.

Figure 2:
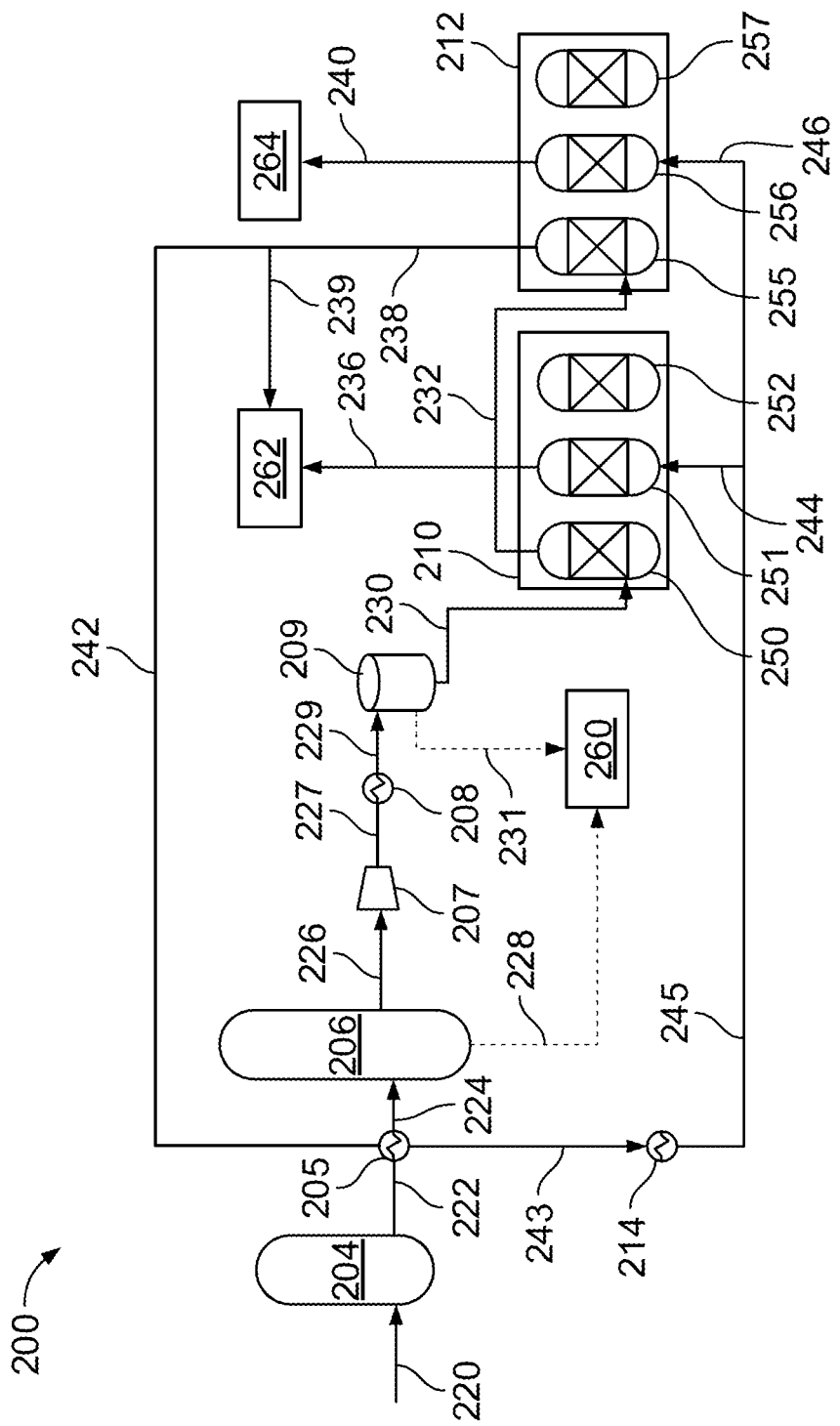

FIG. 2 is a schematic diagram of a system 200 for Claus tail gas treatment. The system 200 includes a hydrogenation reactor 204, a first heat exchanger 205, a quench tower 206, a compressor 207, a second heat exchanger 208, a collection drum 209, a first stage adsorption unit 210, a second stage adsorption unit 212, and a third heat exchanger 214.

A tail gas stream 220 is introduced to the hydrogenation reactor 204 to produce a hydrogenated gas stream 222. The hydrogenated gas stream 222 is cooled via the first heat exchanger 205 to produce a cooled hydrogenated gas stream 224. The cooled hydrogenated gas stream 224 is introduced to the quench tower 206 to produce a quenched gas stream 226 and a first water condensate stream 228. The quenched gas stream 226 is pressurized by the compressor 207 to produce a pressurized quenched gas stream 227. The pressurized quenched gas stream 227 is cooled by the second heat exchanger 208 to produce a cooled quenched gas stream 229. The cooled quenched gas stream 229 is introduced to the collection drum 209 to produce a second water condensate stream 231 and an adsorption feed stream 230.

In some examples, the first water condensate stream 228 and the second water condensate stream 231 are introduced to a sour water stripper 260 for further processing. As used herein, the term "sour water stripper" refers to a device or apparatus that removes hydrogen sulfide from water containing hydrogen sulfide (referred to as sour water). For example, liquid water separated by a collection drum can include hydrogen sulfide. The liquid water can be introduced to a sour water stripper, where steam is injected into the sour water stripper to shift the chemical equilibria by heating the sour water such that hydrogen sulfide is released.

The adsorption feed stream 230 is introduced to the first stage adsorption vessel 250 of the first stage adsorption unit 210 to produce a first outlet gas stream 232. The first outlet gas stream 232 is introduced to the second stage adsorption vessel 255 of the second stage adsorption unit 212 to produce a second byproduct stream 238. The second byproduct stream 238 is separated into a first portion 239 and a second portion 242. In some examples, a conduit fitting (e.g., pipe tee) provides for splitting (dividing) the flow of the second byproduct stream 238 into the two portions 239 and 242. A flow control valve can be disposed along a conduit conveying the portion 239 or the portion 242 or both. Other conduit/control arrangements are applicable.

The first portion 239 of the second byproduct stream and the first byproduct stream 236 are introduced into a thermal oxidizer 262 for further processing. As used herein, the term "thermal oxidizer," sometimes also called a thermal incinerator, refers to a device or apparatus that thermally decomposes certain gases at high temperature and releases them into the atmosphere. For example, a gas stream can be introduced to a thermal oxidizer, where any trace quantities of hydrogen sulfide included in the gas stream are oxidized to sulfur dioxide and subsequently released to the atmosphere. The thermal oxidizer 262 can be, e.g., a direct-fired thermal oxidizer, regenerative thermal oxidizer (RTO), catalytic oxidizer, and so on.

The second portion 242 of the second byproduct stream 238 is used as regeneration gas, described in the next paragraph. In some examples, a majority of the second byproduct stream 238 is split into the first portion 239 that is sent to the thermal oxidizer 262, and the amount of the second byproduct stream 238 that constitutes the second portion 242 utilized as regeneration gas is a slip stream of the second byproduct stream 238. As used herein, the term "slip stream" means a diversion of a small amount (e.g., less than 20%) of a main stream.

The second portion 242 of the second byproduct stream 238 is heated via the first heat exchanger 205 to produce a heated second portion 243 of the second byproduct stream by exchanging heat from the hydrogenated gas stream 222. In some examples (as shown in FIG. 2), the second portion 243 of the second byproduct stream is further heated via the third heat exchanger 214 to produce a heated second portion 245 of the second byproduct stream. The heated second portion 245 of the second byproduct stream is separated into a first regeneration gas stream 244 and a second regeneration gas stream 246. The first regeneration gas stream 244 is introduced to the first stage adsorption vessel 251 of the first stage adsorption unit 210 to produce a first byproduct stream 236.

The second regeneration gas stream 246 is introduced to the second stage adsorption vessel 256 of the second stage adsorption unit 212 to produce a second outlet gas stream 240. The second outlet gas stream 240 is introduced to a reaction furnace 264 of a Claus unit for further processing. As used herein, the term "reaction furnace" refers to a device or apparatus that is typically included in an upstream portion of a Claus unit, which initiates the conversion of hydrogen sulfide and other sulfur-containing compounds to elemental sulfur. The reaction furnace typically operates at a temperature greater than 850° C. such that hydrogen sulfide is converted to elemental sulfur.

The tail gas stream 220 includes a Claus tail gas that includes sulfur-containing compounds, e.g., sulfur-containing compounds that were not fully recovered by an upstream Claus unit. The sulfur-containing compounds can exist in forms such as elemental sulfur, hydrogen sulfide, sulfur oxides, and anionic counterparts of the same. Non-limiting example sulfur oxides include $SO$, $SO_2$, $SO_3$, $SO_4$, $S_2O$, $S_2O_2$, $S_6O$, $S_6O_2$, $S_7O$, $S_7O_2$, $S_8O$, $S_9O$, and $S_{10}O$. The Claus tail gas in the tail gas stream 220 can also include carbon dioxide, water, nitrogen, hydrogen, and combinations of the same.

In some examples, the tail gas stream 220 is preheated to a temperature at which hydrogenation reactions can occur in hydrogenation reactor 204. For instance, the tail gas stream 220 is preheated to a temperature between about 200° C. and about 300° C., e.g., between about 220° C. and about 280° C., or between about 240° C. and about 260° C., e.g., about 250° C.

The hydrogenation reactor 204 can be any reactor, catalytic or non-catalytic, capable of reducing the sulfur-containing compounds in the tail gas stream 220 other than hydrogen sulfide to hydrogen sulfide. In some examples, hydrogen included in the tail gas stream 220 is used for reducing the sulfur-containing compounds in the tail gas stream 220 to hydrogen sulfide. In some examples, a make-up hydrogen gas stream (not shown) is introduced to the hydrogenation reactor 204. In some examples, water is produced as a byproduct during the hydrogenation reaction. As a result, the hydrogenated gas stream 222 includes sulfur-containing compounds of substantially hydrogen sulfide only. The hydrogenated gas stream 222 can also include carbon dioxide, water, nitrogen, and combinations of the same.

The first heat exchanger 205 can be any heat exchanger (e.g., shell-and-tube heat exchanger, plate type heat exchanger, etc.) capable of cooling a gas stream, in exchange of heating a separate gas stream, to a temperature suitable for the operation of the quench tower 206. In the example of FIG. 2, the first heat exchanger 205 is a gas-gas heat exchanger that enables heat transfer by cross exchange between the hydrogenated gas stream 222 and a second portion 242 of the second byproduct stream (discussed in later paragraphs). The first heat exchanger 205 cools the hydrogenated gas stream 222 such that the cooled hydrogenated gas stream 224 has a temperature between about 20° C. and about 170° C., e.g., between about 30° C. and about 100° C., or between about 40° C. and about 80° C., e.g., at least about 43° C. The cooled hydrogenated gas stream 224 includes the sulfur-containing compounds, carbon dioxide, water, nitrogen, hydrogen, and combinations of the same. In some examples, the first heat exchanger 205 heat the second portion 242 of the byproduct stream such that the heated second portion 243 has a temperature between about 150° C. and about 350° C., e.g., between about 200° C. and about 300° C., or between about 230° C. and about 290° C., e.g., at least about 260° C.

In some examples, the third heat exchanger 214 can be used to heat the second portion 243 of the second byproduct stream to meet the temperature requirements of adsorbent regeneration for each of the first stage adsorption unit 210 and the second stage adsorption unit 212. The third heat exchanger 214 can be any heat exchanger (e.g., shell-and-tube heat exchanger, plate type heat exchanger, etc.) capable of heating a gas stream to a temperature at which adsorbent regeneration occurs in each of the first stage adsorption unit 210 and the second stage adsorption unit 212. In some examples, the third heat exchanger 214 uses steam (e.g., condensing steam), steam condensate, oil, or another heat transfer fluid. The third heat exchanger 214 can heat the second portion 243 of the second byproduct stream such that the heated second byproduct stream 245 (and thus each of the first regeneration gas stream 244 and the second regeneration gas stream 246) has a temperature between about 150° C. and about 350° C., e.g., between about 200° C. and about 300° C., or between about 230° C. and about 290° C., e.g., about 260° C. In some examples, a controlled temperature ramp is implemented during regeneration, in which case the second portion 243 of the second byproduct stream is heated to different temperatures over time and up to 400° C., e.g., as described in U.S. patent application Ser. No. 17/166,821, the contents of which are incorporated here by reference in their entirety.

The quench tower 206 can be any apparatus capable of condensing and recovering water from the heated hydrogenated gas stream 224. A significant portion of water included in the heated hydrogenated gas stream 224 is condensed and substantially recovered via the first water condensate stream 228. Although a significant portion of water included in hydrogenated gas stream 224 is removed, the quenched gas stream 226 output from the quench tower 206 can still include residual amounts of gas phase water. For instance, the quenched gas stream 226 can have a gas phase water content ranging between about 0 mol % and about 20 mol %, e.g., between about 3 mol % and about 15 mol %, or between about 4 mol % and about 10 mol %, e.g., about 8 mol %. The quenched gas stream 226 can also include hydrogen sulfide (such as the hydrogen sulfide preexisting in the Claus tail gas, hydrogen sulfide produced in the hydrogenation reactor 204, or both), carbon dioxide, nitrogen, and combinations of the same. The quenched gas stream 226 has a temperature ranging between about 20° C. and about 170° C., e.g., between about 30° C. and about 100° C., or between about 40° C. and about 80° C., e.g., about 43° C. The quench tower 206 may be a quench tower, quench vessel, quench column, quench condenser, quench heat exchanger, and so forth.

The compressor 207 can be any type of pressurizing device or apparatus capable of increasing the pressure of the quenched gas stream 226. The compressor 207 can be a mechanical compressor. For instance, the compressor 207 can be a diaphragm metering pump. The pressure of the quenched gas stream 226 is increased via the compressor 207 such that the pressurized quenched gas stream 227 has a pressure ranging between about 1 bar and about 10 bar, e.g., between about 1 bar and about 5 bar, or between about 2 bar and about 4 bar, e.g., about 3 bar. The unit "bar" as used herein is bar gauge ["bar(g)" or "barg"].

The second heat exchanger 208 can be any heat exchanger (e.g., shell-and-tube heat exchanger, plate type heat exchanger, etc.) capable of cooling a gas stream to a temperature at which adsorption occurs in the first stage adsorption unit 210. The second heat exchanger 208 can cool the pressurized quenched gas stream 227 such that the cooled quenched gas stream 229 has a temperature ranging between about 0° C. and about 50° C., e.g., between about 5° C. and about 40° C., or between about 10° C. and about 30° C., e.g., about 15° C. As the pressurized quenched gas stream 227 is cooled, the gas phase water content of the cooled quenched gas stream 229 reduces to a range between about 0 mol % and about 10 mol %, e.g., between about 0 mol % and about 5 mol %, or alternately between about 0 mol % and about 1 mol %, e.g., about 0.46 mol %. The cooled quenched gas stream 229 can include hydrogen sulfide (such as the hydrogen sulfide preexisting in the Claus tail gas, hydrogen sulfide produced in the hydrogenation reactor 204, or both), carbon dioxide, water, nitrogen, and combinations of the same.

The collection drum 209 can be any type of separation device (e.g., separation vessel) capable of separating a fluid stream into a gas phase stream and a liquid phase stream. The cooled quenched gas stream 229 is separated in the collection drum 209 to produce the second water condensate stream 231 (a liquid phase stream) and the adsorption feed stream 230 (a gas phase stream). The adsorption feed stream 230 can include hydrogen sulfide (such as the hydrogen sulfide preexisting in the Claus tail gas, hydrogen sulfide produced in the hydrogenation reactor 204, or both), carbon dioxide, water, nitrogen, and combinations of the same.

In some examples, the first water condensate stream 228 includes trace quantities of hydrogen sulfide dissolved in water collected from the quench tower 206. In some examples, the second water condensate stream 231 includes trace quantities of hydrogen sulfide dissolved in water collected from the collection drum 209. Each of the first water condensate stream 228 and the second water condensate stream 231 can be introduced to the sour water stripper 260 for further processing such as stripping hydrogen sulfide from water.

The first stage adsorption unit 210 includes first stage adsorption vessels 250, 251, 252 fluidly connected in a parallel manner. At any given moment during operation, one of first stage adsorption vessels 250, 251, 252 is undergoing an adsorption cycle, one of first stage adsorption vessels 250, 251, 252 is undergoing a regeneration cycle, and one of first stage adsorption vessels 250, 251, 252 is standing by. In this manner, components of the adsorption feed stream 230 can be continuously fed to the first stage adsorption unit 210 and a continuous flow of the first outlet gas stream 232 and the first byproduct stream 236 can be produced from the first stage adsorption unit 210.

Each of the first stage adsorption vessels 250, 251, 252 is filled, e.g., packed, with a first adsorbent. The first adsorbent can be in a bed of first adsorbent in the vessels 250, 251, 252. In some examples, the first adsorbent includes any adsorbent capable of selectively capturing water from a wet gas stream (such as the adsorption feed stream 230) while rejecting hydrogen sulfide, carbon dioxide, and nitrogen. Non-limiting example materials used for the first adsorbent include hydrophilic 3A molecular sieves. During the adsorption cycle, components of the adsorption feed stream 230 are introduced through one of the first stage adsorption vessels 250, 251, 252. Water (and relatively small amount of hydrogen sulfide) is captured in the pores of the first adsorbent. Components other than water (e.g., hydrogen sulfide, carbon dioxide, and nitrogen) pass through the first adsorbent to produce the first outlet gas stream 232 substantially in the absence of water. During the regeneration cycle, components of the first regeneration gas stream 244 (e.g., carbon dioxide and nitrogen) enter one of the first stage adsorption vessels 250, 251, 252 to regenerate the first adsorbent. Desorption occurs in one of the first stage adsorption vessels 250, 251, 252, where the first adsorbent releases the captured water (and the relatively small amount of hydrogen sulfide) (and optionally trace quantities of carbon dioxide and nitrogen) which are collected via the first byproduct stream 236.

In the example of FIG. 2, the first stage adsorption vessel 250 is undergoing the adsorption cycle, the first stage adsorption vessel 251 is undergoing the regeneration cycle, and the first stage adsorption vessel 252 is in standby mode. During the adsorption cycle, components of the adsorption feed stream 230 are introduced through the first stage adsorption vessel 250. Water (and relatively small amount of hydrogen sulfide) is captured in the pores of the first adsorbent. In some examples, trace quantities of carbon dioxide and nitrogen are captured in the pores of the first adsorbent. Components other than water (e.g., hydrogen sulfide, carbon dioxide, and nitrogen) pass through the first adsorbent to produce first outlet gas stream 232 substantially in the absence of water.

During the regeneration cycle, components of the first regeneration gas stream 244 (e.g., carbon dioxide and nitrogen) enter the first stage adsorption vessel 251 to regenerate the first adsorbent. Desorption occurs in the first stage adsorption vessel 251, where the first adsorbent releases the captured water and the captured relatively small amount of hydrogen sulfide (and optionally trace quantities of carbon dioxide and nitrogen) which are collected via the first byproduct stream 236.

The second stage adsorption unit 212 includes second stage adsorption vessels 255, 256, 257 fluidly connected in a parallel manner. At any given moment during operation, one of second stage adsorption vessels 255, 256, 257 is undergoing an adsorption cycle, one of second stage adsorption vessels 255, 256, 257 is undergoing a regeneration cycle, and one of second stage adsorption vessels 255, 256, 257 is standing by. In this manner, components of the first outlet gas stream 232 can be continuously fed to second stage adsorption unit 212 and a continuous flow of the second outlet gas stream 240 and the second byproduct stream 238 can be produced from the second stage adsorption unit 212.

Each of the second stage adsorption vessels 255, 256, 257 is filled or packed with a second adsorbent. The second adsorbent may be configured as an adsorbent bed in the vessels 255, 256, 257. In some examples, the second adsorbent includes any adsorbent capable of selectively capturing hydrogen sulfide while rejecting carbon dioxide and nitrogen. In some examples, the second adsorbent includes any adsorbent having differences in breakthrough time between hydrogen sulfide and carbon dioxide, and between hydrogen sulfide and nitrogen. Non-limiting example materials used for the second adsorbent include molecular sieves (e.g., molecular sieve 4A, etc.); hydrophobic zeolites having a framework such as an MFI type, a CHA type, an FAU type, an MOR type, a DDR type, an FER type, and an MWW type; and hydrophobic zeolites such as MOFs and ZIFs. In a specific example, the second adsorbent includes a Cu—Y type zeolite, which is a derivative of an FAU type zeolite including copper cations as counterions.

During the adsorption cycle, components of the first outlet gas stream 232 are introduced through the one or more second stage adsorption vessels 255, 256, 257 of the second stage adsorption unit 212. Hydrogen sulfide is captured in the pores of the second adsorbent. Components other than hydrogen sulfide (e.g., carbon dioxide and nitrogen) pass through the second adsorbent and are subsequently collected via the second byproduct stream 238. During the regeneration cycle, components of the second regeneration gas stream 246 (e.g., carbon dioxide and nitrogen) enter the one or more second stage adsorption vessels 255, 256, 257 to regenerate the second adsorbent. Desorption occurs in the one or more second stage adsorption vessels 255, 256, 257, where the second adsorbent releases the captured hydrogen sulfide (and optionally trace quantities of carbon dioxide and nitrogen) to produce the second outlet gas stream 240. The second outlet gas stream 240 includes hydrogen sulfide, carbon dioxide, and nitrogen.

In the example of FIG. 2, the second stage adsorption vessel 255 is undergoing the adsorption cycle, the second stage adsorption vessel 256 is undergoing the regeneration cycle, and the second stage adsorption vessel 257 is in standby mode. During the adsorption cycle, components of the first outlet gas stream 232 are introduced through the second stage adsorption vessel 255. Hydrogen sulfide is captured in the pores of the second adsorbent. In some examples, trace quantities of carbon dioxide and nitrogen are captured in the pores of the second adsorbent. Components other than hydrogen sulfide (e.g., carbon dioxide and nitrogen) pass through the second adsorbent to produce the second byproduct stream 238 substantially in the absence of hydrogen sulfide. During the regeneration cycle, components of the second regeneration gas stream 246 (e.g., carbon dioxide and nitrogen) enter the second stage adsorption vessel 256 to regenerate the second adsorbent. Desorption occurs in the second stage adsorption vessel 256, where the second adsorbent releases the captured hydrogen sulfide (and optionally trace quantities of carbon dioxide and nitrogen) which is collected via the second outlet gas stream 240.

The second outlet gas stream 240 includes hydrogen sulfide, carbon dioxide, and nitrogen. The second outlet gas stream 240 has a hydrogen sulfide content ranging between about 0 wt. % and about 99 wt. %, e.g., between about 5 wt. % and about 70 wt. %, between about 5 wt. % and about 50 wt. %, between about 5 wt. % and about 30 wt. %, or between about 10 wt. % and about 20 wt. %, e.g., about 13.3 wt. %. The second outlet gas stream 240 has a carbon dioxide content ranging between about 0 wt. % and about 99 wt. %, e.g., between about 20 wt. % and about 95 wt. %, between about 30 wt. % and about 90 wt. %, between about 50 wt. % and about 80 wt. %, or between about 60 wt. % and about 70 wt. %, e.g., about 66.7 wt. %. The second outlet gas stream 240 has a nitrogen content ranging between about 0 wt. % and about 99 wt. %, e.g., between about 5 wt. % and about 70 wt. %, between about 5 wt. % and about 50 wt. %, between about 10 wt. % and about 30 wt. %, or between about 15 wt. % and about 25 wt. %, e.g., about 20.0 wt. %. In some examples, the second outlet gas stream 240 is used as a feed gas for the Claus unit. For instance, as shown in FIG. 2, the second outlet gas stream 240 is introduced to the reaction furnace 264 of the Claus unit.

Figure 3:
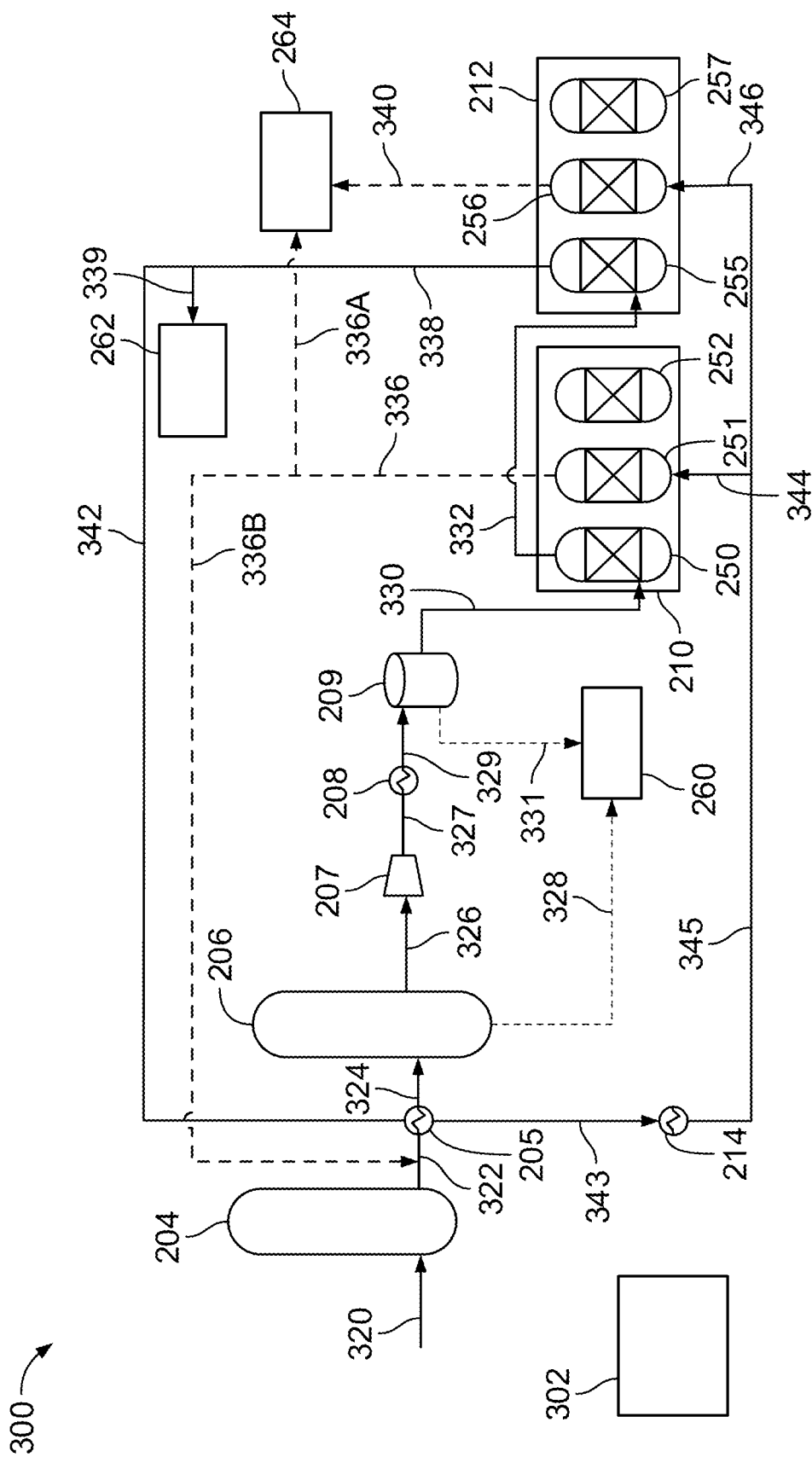

FIG. 3 is a schematic diagram of a Claus tail gas treatment system 300. Features of the system 300 that are analogous to features described with respect to the system 200 are given like reference numerals. The system 300 of FIG. 3 implements a temperature-ramping regeneration scheme utilizing a slip stream of carbon dioxide and nitrogen. Further description of temperature ramping regeneration schemes can be found in U.S. patent application Ser. No. 17/166,821, the contents of which are incorporated here by reference in their entirety.

The system 300 includes the hydrogenation reactor 204 (e.g., a reactor vessel) to receive a tail gas stream 320 including a Claus tail gas and to hydrogenate sulfur-containing compounds in the Claus tail gas into hydrogen sulfide to produce a hydrogenated gas stream 322 including hydrogen sulfide, water, and at least one of carbon dioxide or water. In some examples, the hydrogenated gas does not include sulfur-containing compounds other than hydrogen sulfide. In some examples, any sulfur-containing compounds other than hydrogen sulfide in the hydrogenated gas may be only at trace amounts (or not readily measurable) in the hydrogenated gas.

The hydrogenated gas stream 322 is cooled via the first heat exchanger 205 to produce a cooled hydrogenated gas stream 324. The quench tower 206 receives the cooled hydrogenated gas stream 324 and condenses water in the hydrogenated gas to produce a quenched gas stream 326 containing sulfide, water, and at least of one carbon dioxide or nitrogen. Condensed water (with some hydrogen sulfide) is recovered in the quench tower 206 as a first water condensate stream 328 which can be sent to the sour water stripper (SWS) column 260.

The quenched gas stream 326 is pressurized by the compressor 207 to produce a pressurized quenched gas stream 327. The pressurized quenched gas stream 327 is cooled by the second heat exchanger 208 to produce a cooled quenched gas stream 329. The cooled quenched gas stream 329 is introduced to the collection drum 209 to produce a second water condensate stream 331 and an adsorption feed stream 330. The second water condensate stream 331 can be sent to the SWS column 260.

The adsorption feed stream 330 is introduced into the first stage adsorption unit 210. In the illustrated example, the first stage adsorption vessel 250 is undergoing the adsorption cycle, the first stage adsorption vessel 251 is undergoing the regeneration cycle, and the first stage adsorption vessel 252 is in standby mode. The adsorption feed stream 330 is provided to the first stage adsorption vessel 250 which, operating in an adsorption cycle, adsorbs water from the adsorption feed stream 330 onto the first adsorbent, thereby producing a first outlet gas stream 332 containing hydrogen sulfide and at least one of carbon dioxide or nitrogen. In some examples, a significant portion (e.g., most or substantially all) of the water in the adsorption feed stream 330 is adsorbed onto the first adsorbent in the first stage adsorption vessel 250 operating in the adsorption cycle. A relatively small amount of hydrogen sulfide may be adsorbed from the adsorption feed stream 330 onto the first adsorbent. In some examples, the first outlet gas stream 332 does not include water, or includes only trace or immeasurable amounts of water.

The first outlet gas stream 332 is introduced into the second stage adsorption unit 212. In the illustrated example, the second stage adsorption vessel 255 is undergoing the adsorption cycle, the second stage adsorption vessel 256 is undergoing the regeneration cycle, and the second stage adsorption vessel 257 is in standby mode. The first outlet gas stream 332 is provided to the second stage adsorption vessel 255 which, operating in an adsorption cycle, adsorbs hydrogen sulfide from the first outlet gas stream 332 onto the second adsorbent, thereby producing produce a second byproduct stream 338 containing at least one of carbon dioxide or nitrogen. In some examples, the second byproduct stream 338 does not include hydrogen sulfide, or includes trace or immeasurable amounts of hydrogen sulfide.

The second byproduct stream 338 is separated into a first portion 339 and a second portion 342. The first portion 339 of the second byproduct stream is introduced into the thermal oxidizer 262 for further processing. The second portion 342 of the second byproduct stream, which can be a slip stream of the second byproduct stream 338, is used as regeneration gas.

The second portion 342 of the second byproduct stream 338 is heated via the first heat exchanger 205 to produce a heated second portion 343 of the second byproduct stream by exchanging heat from the hydrogenated gas stream 322. In some examples (as shown in FIG. 3), the second portion 343 of the second byproduct stream is further heated via the third heat exchanger 214 to produce a heated second portion 345 of the second byproduct stream. The heated second portion 345 of the second byproduct stream is separated into a first regeneration gas stream 344 and a second regeneration gas stream 346.

The first stage adsorption vessel 251 operating in a regeneration cycle receives the first regeneration gas stream 344 as regeneration gas. The first adsorbent in the first stage adsorption vessel 251 is heated, e.g., per a temperature ramp to selectively desorb components from the first adsorbent in the first stage adsorption vessel 251 to produce a first byproduct stream 336 containing desorbed components and at least one of carbon dioxide or nitrogen. As the temperature increases gradually during the temperature ramp in the regeneration cycle, hydrogen sulfide is initially desorbed while the adsorbed water initially generally remains adsorbed in the first adsorbent. As the temperature rises, water starts to desorb from the first adsorbent.

When the temperature of the first adsorbent reaches a level where water starts to desorb (breakthrough) into the first byproduct stream 336 and/or when the concentration of hydrogen sulfide in the first byproduct stream 336 is less In some examples, During a second part of the temperature ramp, the components desorbed from the first adsorbent include water or the concentration of hydrogen sulfide in the first byproduct stream 336 is less than a threshold value, or both. The second part of the temperature ramp is later in time and generally at higher temperature than the first part of the temperature ramp.

In operation, the first stage adsorption vessel 251 discharges the first byproduct stream 336 as a first byproduct stream 336A to the reaction furnace 264 of a Claus unit during the first part of the temperature ramp, when the components desorbed during a first part of the temperature ramp include primarily hydrogen sulfide. During the second part of the temperature ramp, water starts to desorb into the first byproduct stream 336 and/or the hydrogen concentration in the first byproduct stream 336 becomes lower than a certain value. In this second part, the first byproduct stream 336 is routed as a first byproduct stream 336B to the quench tower 206 for handling of the water and to avoid introduction of inert components of the regeneration gas to the Claus reaction furnace 264.

The second regeneration gas stream 346 is introduced to the second stage adsorption vessel 256 of the second stage adsorption unit 212. In the regeneration cycle, hydrogen sulfide is desorbed from the second adsorbent in the second stage adsorption vessel 256, producing a second outlet gas stream 340 containing hydrogen sulfide and at least one of carbon dioxide or nitrogen. The second outlet gas stream 340 is introduced to the reaction furnace 264 of the Claus unit for further processing.

Figure 4:
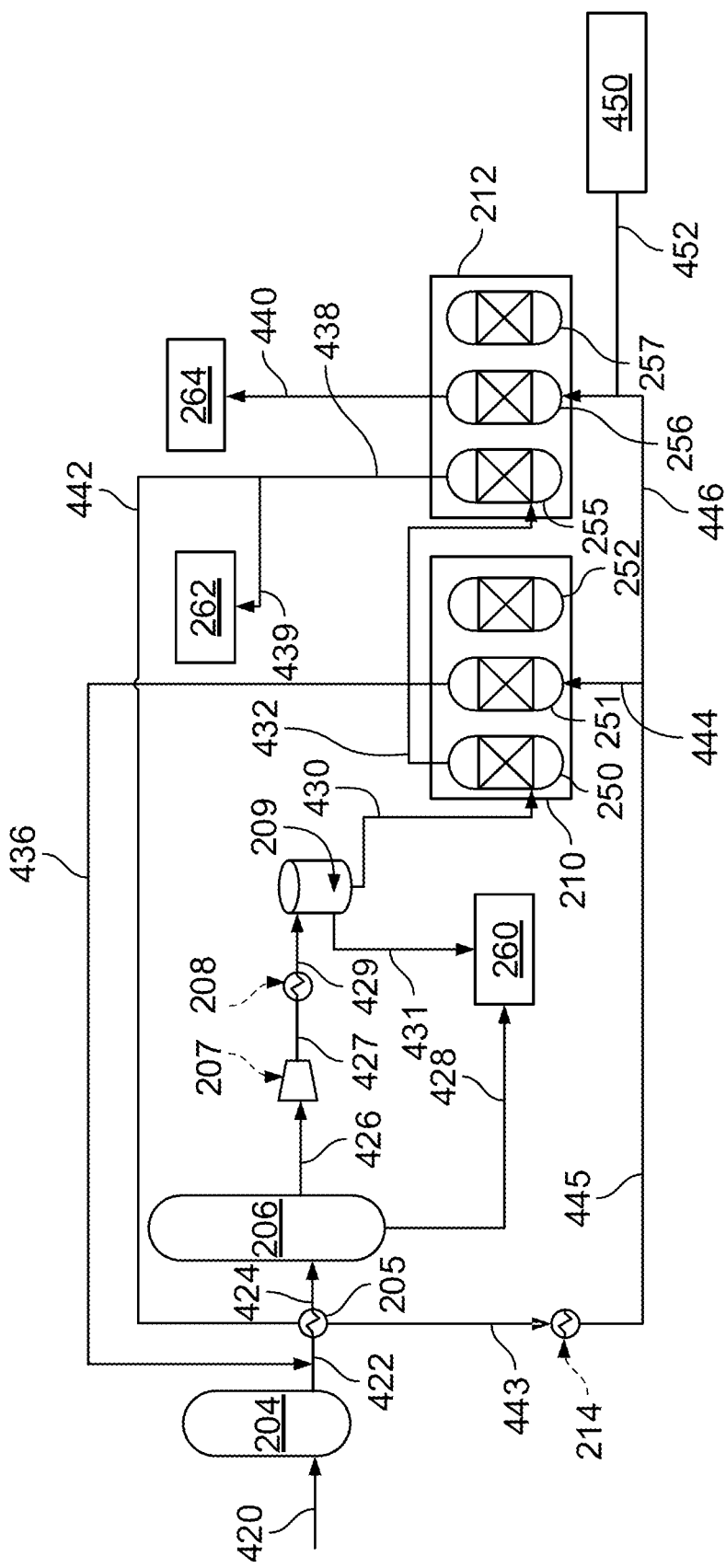

FIG. 4 is a schematic diagram of a Claus tail gas treatment system 400 that implements a two-phase regeneration cycle for the second stage adsorption vessels. Features of the system 400 that are analogous to features described with respect to the system 200 are given like reference numerals.

The system 400 includes the hydrogenation reactor 204 (e.g., a reactor vessel) to receive a tail gas stream 420 including a Claus tail gas and to hydrogenate sulfur-containing compounds in the Claus tail gas into hydrogen sulfide to produce a hydrogenated gas stream 422 including hydrogen sulfide, water, and at least one of carbon dioxide or water. In some examples, the hydrogenated gas does not include sulfur-containing compounds other than hydrogen sulfide. In some examples, any sulfur-containing compounds other than hydrogen sulfide in the hydrogenated gas may be only at trace amounts (or not readily measurable) in the hydrogenated gas.

The hydrogenated gas stream 422 is cooled via the first heat exchanger 205 to produce a cooled hydrogenated gas stream 424. The quench tower 206 receives the cooled hydrogenated gas stream 424 and condenses water in the hydrogenated gas to produce a quenched gas stream 426 containing sulfide, water, and at least of one carbon dioxide or nitrogen. Condensed water (with some hydrogen sulfide) is recovered in the quench tower 206 as a first water condensate stream 428 which can be sent to the sour water stripper (SWS) column 260.

The quenched gas stream 426 is pressurized by the compressor 207 to produce a pressurized quenched gas stream 427. The pressurized quenched gas stream 427 is cooled by the second heat exchanger 208 to produce a cooled quenched gas stream 429. The cooled quenched gas stream 429 is introduced to the collection drum 209 to produce a second water condensate stream 431 and an adsorption feed stream 430. The second water condensate stream 431 can be sent to the SWS column 260.

The adsorption feed stream 430 is introduced into the first stage adsorption unit 210. In the illustrated example, the first stage adsorption vessel 250 is undergoing the adsorption cycle, the first stage adsorption vessel 251 is undergoing the regeneration cycle, and the first stage adsorption vessel 252 is in standby mode. The adsorption feed stream 430 is provided to the first stage adsorption vessel 250 which, operating in an adsorption cycle, adsorbs water from the adsorption feed stream 430 onto the first adsorbent, thereby producing a first outlet gas stream 432 containing hydrogen sulfide and at least one of carbon dioxide or nitrogen. In some examples, a significant portion (e.g., most or substantially all) of the water in the adsorption feed stream 430 is adsorbed onto the first adsorbent in the first stage adsorption vessel 250 operating in the adsorption cycle. A relatively small amount of hydrogen sulfide may be adsorbed from the adsorption feed stream 430 onto the first adsorbent. In some examples, the first outlet gas stream 432 does not include water, or includes only trace or immeasurable amounts of water.

The first outlet gas stream 432 is introduced into the second stage adsorption unit 212. In the illustrated example, the second stage adsorption vessel 255 is undergoing the adsorption cycle, the second stage adsorption vessel 256 is undergoing the regeneration cycle, and the second stage adsorption vessel 257 is in standby mode. The first outlet gas stream 432 is provided to the second stage adsorption vessel 255 which, operating in an adsorption cycle, adsorbs hydrogen sulfide from the first outlet gas stream 432 onto the second adsorbent, thereby producing produce a second byproduct stream 438 containing at least one of carbon dioxide or nitrogen. In some examples, the second byproduct stream 438 does not include hydrogen sulfide, or includes trace or immeasurable amounts of hydrogen sulfide.

The second byproduct stream 438 is separated into a first portion 439 and a second portion 442. The first portion 439 of the second byproduct stream is introduced into the thermal oxidizer 262 for further processing. The second portion 442 of the second byproduct stream, which can be a slip stream of the second byproduct stream 438, is used as regeneration gas.

The second portion 442 of the second byproduct stream 438 is heated via the first heat exchanger 205 to produce a heated second portion 443 of the second byproduct stream by exchanging heat from the hydrogenated gas stream 422. In some examples (as shown in FIG. 4), the second portion 443 of the second byproduct stream is further heated via the third heat exchanger 214 to produce a heated second portion 445 of the second byproduct stream. The heat exchangers 205, 214 heat the second byproduct stream to a temperature sufficient for desorption of hydrogen sulfide from the adsorption vessels in their regeneration cycle. The heated second portion 445 of the second byproduct stream is separated into a first regeneration gas stream 444 and a second regeneration gas stream 446.

The first regeneration gas stream 444 is fed into the first stage adsorption vessel 251, which is undergoing the regeneration cycle, to regenerate the first adsorbent. Desorption occurs in the first stage adsorption vessel 251, where the first adsorbent releases the captured water and the captured relatively small amount of hydrogen sulfide (and optionally trace quantities of carbon dioxide and nitrogen) which are collected via the first byproduct stream 436. The first byproduct stream 436 is routed to the quench tower 206.

Regeneration of the second stage adsorption vessel 256, which is undergoing the regeneration cycle, is a two-phase process. In a first phase, the second regeneration gas stream 446, which is a slip stream of the second byproduct gas and contains carbon dioxide and nitrogen, is introduced into the second stage adsorption vessel 256. Following the first phase, the flow of the regeneration gas stream 446 is stopped and a second regeneration phase occurs, in which a stream of high purity nitrogen gas 452 is introduced into the second stage adsorption vessel 256. High purity nitrogen gas can have a purity of at least 99%, at least 99.5%, at least 99.9%, or at least 99.95%. The stream of high purity nitrogen gas 452 is from a nitrogen source, e.g., a cryogenic nitrogen tank, such as a nitrogen source available on site for blanketing or purging. In the regeneration cycle, hydrogen sulfide is desorbed from the second adsorbent in the second stage adsorption vessel 256, producing a second outlet gas stream 440 containing hydrogen sulfide and at least one of carbon dioxide or nitrogen. The second outlet gas stream 440 is introduced to the reaction furnace 264 of the Claus unit for further processing.

A two-phase regeneration cycle for the second stage adsorption vessel 256, in which regeneration is accomplished first using a slip stream containing carbon dioxide and nitrogen, and then using high purity nitrogen, can have advantages. For instance, this two-phase regeneration cycle can facilitate removal of hydrogen sulfide from the second stage adsorption vessel 256, which can result in an improve hydrogen sulfide adsorption capacity during the adsorption cycle.

Figure 5:
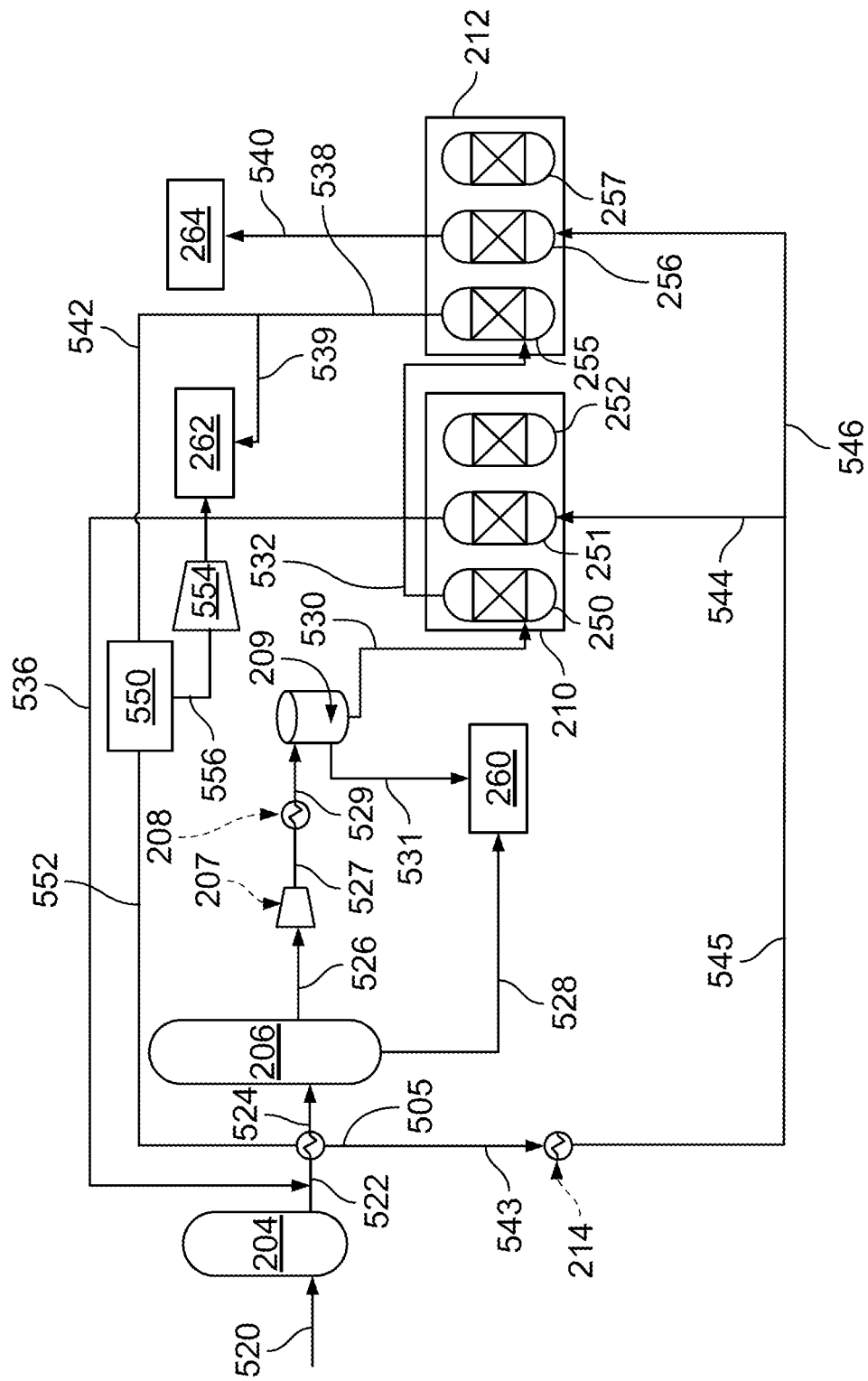

FIG. 5 is a schematic diagram of a Claus tail gas treatment system 500. Features of the system 500 that are analogous to features described with respect to the system 200 are given like reference numerals.

The system 500 includes the hydrogenation reactor 204 (e.g., a reactor vessel) to receive a tail gas stream 520 including a Claus tail gas and to hydrogenate sulfur-containing compounds in the Claus tail gas into hydrogen sulfide to produce a hydrogenated gas stream 522 including hydrogen sulfide, water, and at least one of carbon dioxide or water. In some examples, the hydrogenated gas does not include sulfur-containing compounds other than hydrogen sulfide. In some examples, any sulfur-containing compounds other than hydrogen sulfide in the hydrogenated gas may be only at trace amounts (or not readily measurable) in the hydrogenated gas.

The hydrogenated gas stream 522 is cooled via the first heat exchanger 205 to produce a cooled hydrogenated gas stream 524. The quench tower 206 receives the cooled hydrogenated gas stream 524 and condenses water in the hydrogenated gas to produce a quenched gas stream 526 containing sulfide, water, and at least of one carbon dioxide or nitrogen. Condensed water (with some hydrogen sulfide) is recovered in the quench tower 206 as a first water condensate stream 528 which can be sent to the sour water stripper (SWS) column 260.

The quenched gas stream 526 is pressurized by the compressor 207 to produce a pressurized quenched gas stream 527. The pressurized quenched gas stream 527 is cooled by the second heat exchanger 208 to produce a cooled quenched gas stream 529. The cooled quenched gas stream 529 is introduced to the collection drum 209 to produce a second water condensate stream 531 and an adsorption feed stream 530. The second water condensate stream 531 can be sent to the SWS column 260.

The adsorption feed stream 530 is introduced into the first stage adsorption unit 210. In the illustrated example, the first stage adsorption vessel 250 is undergoing the adsorption cycle, the first stage adsorption vessel 251 is undergoing the regeneration cycle, and the first stage adsorption vessel 252 is in standby mode. The adsorption feed stream 530 is provided to the first stage adsorption vessel 250 which, operating in an adsorption cycle, adsorbs water from the adsorption feed stream 530 onto the first adsorbent, thereby producing a first outlet gas stream 532 containing hydrogen sulfide and at least one of carbon dioxide or nitrogen. In some examples, a significant portion (e.g., most or substantially all) of the water in the adsorption feed stream 530 is adsorbed onto the first adsorbent in the first stage adsorption vessel 250 operating in the adsorption cycle. A relatively small amount of hydrogen sulfide may be adsorbed from the adsorption feed stream 530 onto the first adsorbent. In some examples, the first outlet gas stream 532 does not include water, or includes only trace or immeasurable amounts of water.

The first outlet gas stream 532 is introduced into the second stage adsorption unit 212. In the illustrated example, the second stage adsorption vessel 255 is undergoing the adsorption cycle, the second stage adsorption vessel 256 is undergoing the regeneration cycle, and the second stage adsorption vessel 257 is in standby mode. The first outlet gas stream 532 is provided to the second stage adsorption vessel 255 which, operating in an adsorption cycle, adsorbs hydrogen sulfide from the first outlet gas stream 532 onto the second adsorbent, thereby producing produce a second byproduct stream 538 containing at least one of carbon dioxide or nitrogen. In some examples, the second byproduct stream 538 does not include hydrogen sulfide, or includes trace or immeasurable amounts of hydrogen sulfide.

The second byproduct stream 538 is separated into a first portion 539 and a second portion 542. The first portion 539 of the second byproduct stream is introduced into the thermal oxidizer 262 for further processing. The second portion 542 of the second byproduct stream, which can be a slip stream of the second byproduct stream 538, is used as regeneration gas.

The second portion 542 of the second byproduct stream 538 is directed through a CO2 separation element 550 that separates carbon dioxide gas (CO2) from the second portion 542 of the stream. In the example of FIG. 5, the CO2 separation element 550 is a CO2 selective membrane that separates carbon dioxide gas under vacuum provided by a vacuum pump 554. In some examples, the CO2 separation element 550 is a cryogenic separation element that is capable of separating CO2 from the second portion 542 of the stream at cryogenic temperature. The output of the CO2 separation element 550 (e.g., from the CO2 selective membrane or the cryogenic separation element) is a stream 556 of carbon dioxide and a stream 552 of enriched nitrogen.

The stream 556 of carbon dioxide is directed to the thermal oxidizer 262. The stream 552 of enriched nitrogen exiting the CO2 separation element 550 is heated via the first heat exchanger 205 to produce a heated stream 543 of enriched nitrogen by exchanging heat from the hydrogenated gas stream 522. In some examples (as shown in FIG. 5), the heated stream 543 of enriched nitrogen is further heated via the third heat exchanger 214 to produce a heated stream 545. The heat exchangers 205, 214 heat the enriched nitrogen stream to a temperature sufficient for desorption of hydrogen sulfide from the adsorption vessels in their regeneration cycle. The heated stream 545 of enriched nitrogen is separated into a first regeneration gas stream 544 and a second regeneration gas stream 546, both of which are enriched nitrogen streams.

The first regeneration gas stream 544 (an enriched nitrogen stream) is fed into the first stage adsorption vessel 251, which is undergoing the regeneration cycle, to regenerate the first adsorbent. Desorption occurs in the first stage adsorption vessel 251, where the first adsorbent releases the captured water and the captured relatively small amount of hydrogen sulfide (and optionally trace quantities of carbon dioxide and nitrogen) which are collected via the first byproduct stream 536. The first byproduct stream 536 is routed to the quench tower 206.

For regeneration of the second stage adsorption vessel 256, which is undergoing the regeneration cycle, the second regeneration gas stream 546 (an enriched nitrogen stream) is introduced into the second stage adsorption vessel 256 for regeneration. In the regeneration cycle, hydrogen sulfide is desorbed from the second adsorbent in the second stage adsorption vessel 256, producing a second outlet gas stream 540 containing hydrogen sulfide and at least one of carbon dioxide or nitrogen. The second outlet gas stream 540 is introduced to the reaction furnace 264 of the Claus unit for further processing.

Regeneration of the first stage adsorption vessel 251 and the second stage adsorption vessel 256 using an enriched nitrogen stream can have advantages, e.g., facilitating removal of hydrogen sulfide from the first and second stage adsorption vessels 251, 256, which can result in an improved hydrogen sulfide adsorption capacity during the adsorption cycle.

Figure 6:
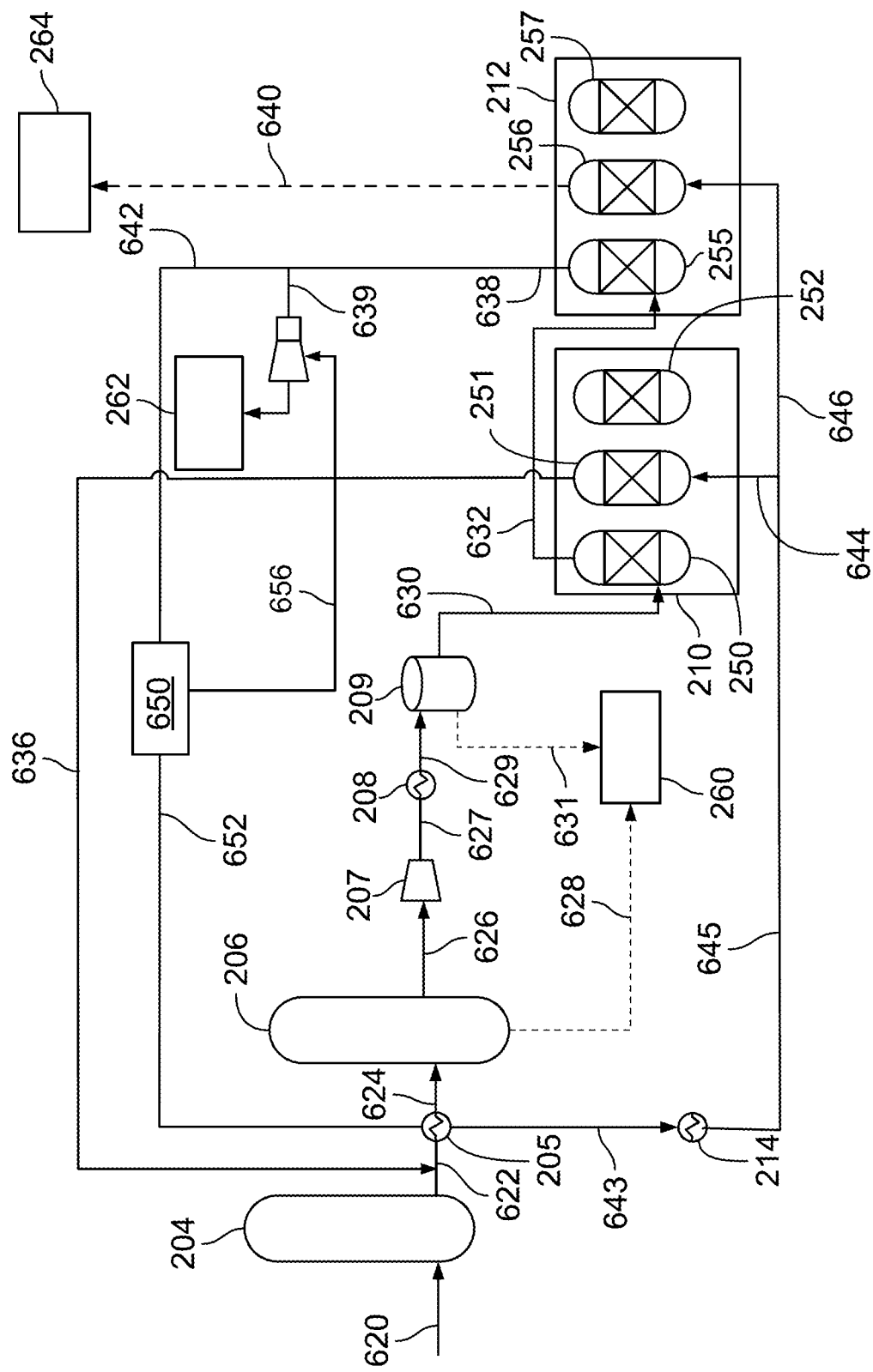

FIG. 6 is a schematic diagram of a Claus tail gas treatment system 600. Features of the system 600 that are analogous to features described with respect to the system 200 are given like reference numerals.

The system 600 includes the hydrogenation reactor 204 (e.g., a reactor vessel) to receive a tail gas stream 620 including a Claus tail gas and to hydrogenate sulfur-containing compounds in the Claus tail gas into hydrogen sulfide to produce a hydrogenated gas stream 622 including hydrogen sulfide, water, and at least one of carbon dioxide or water. In some examples, the hydrogenated gas does not include sulfur-containing compounds other than hydrogen sulfide. In some examples, any sulfur-containing compounds other than hydrogen sulfide in the hydrogenated gas may be only at trace amounts (or not readily measurable) in the hydrogenated gas.

The hydrogenated gas stream 622 is cooled via the first heat exchanger 205 to produce a cooled hydrogenated gas stream 624. The quench tower 206 receives the cooled hydrogenated gas stream 624 and condenses water in the hydrogenated gas to produce a quenched gas stream 626 containing sulfide, water, and at least of one carbon dioxide or nitrogen. Condensed water (with some hydrogen sulfide) is recovered in the quench tower 206 as a first water condensate stream 628 which can be sent to the sour water stripper (SWS) column 260.

The quenched gas stream 626 is pressurized by the compressor 207 to produce a pressurized quenched gas stream 627. The pressurized quenched gas stream 627 is cooled by the second heat exchanger 208 to produce a cooled quenched gas stream 629. The cooled quenched gas stream 629 is introduced to the collection drum 209 to produce a second water condensate stream 631 and an adsorption feed stream 630. The second water condensate stream 631 can be sent to the SWS column 260.

The adsorption feed stream 530 is introduced into the first stage adsorption unit 210. In the illustrated example, the first stage adsorption vessel 250 is undergoing the adsorption cycle, the first stage adsorption vessel 251 is undergoing the regeneration cycle, and the first stage adsorption vessel 252 is in standby mode. The adsorption feed stream 630 is provided to the first stage adsorption vessel 250 which, operating in an adsorption cycle, adsorbs water from the adsorption feed stream 630 onto the first adsorbent, thereby producing a first outlet gas stream 632 containing hydrogen sulfide and at least one of carbon dioxide or nitrogen. In some examples, a significant portion (e.g., most or substantially all) of the water in the adsorption feed stream 630 is adsorbed onto the first adsorbent in the first stage adsorption vessel 250 operating in the adsorption cycle. A relatively small amount of hydrogen sulfide may be adsorbed from the adsorption feed stream 630 onto the first adsorbent. In some examples, the first outlet gas stream 632 does not include water, or includes only trace or immeasurable amounts of water.

The first outlet gas stream 632 is introduced into the second stage adsorption unit 212. In the illustrated example, the second stage adsorption vessel 255 is undergoing the adsorption cycle, the second stage adsorption vessel 256 is undergoing the regeneration cycle, and the second stage adsorption vessel 257 is in standby mode. The first outlet gas stream 632 is provided to the second stage adsorption vessel 255 which, operating in an adsorption cycle, adsorbs hydrogen sulfide from the first outlet gas stream 632 onto the second adsorbent, thereby producing produce a second byproduct stream 638 containing at least one of carbon dioxide or nitrogen. In some examples, the second byproduct stream 638 does not include hydrogen sulfide, or includes trace or immeasurable amounts of hydrogen sulfide.

The second byproduct stream 638 is separated into a first portion 639 and a second portion 642. The first portion 639 of the second byproduct stream is introduced into the thermal oxidizer 262 for further processing. The second portion 642 of the second byproduct stream, which can be a slip stream of the second byproduct stream 638, is used as regeneration gas.

The second portion 642 of the second byproduct stream 638 is directed through a CO2 separation element 650 that separates carbon dioxide gas from the second portion 642 of the stream. In the example of FIG. 6, the CO2 separation element 650 is a CO2 selective membrane that separates carbon dioxide gas from the stream 642. In some examples, the CO2 separation element 650 is a cryogenic separation element that is capable of separating CO2 from the second portion 642 of the stream at cryogenic temperature. The output of the CO2 separation element 650 (e.g., from the CO2 selective membrane or the cryogenic separation unit) is a stream 656 of carbon dioxide and a stream 652 of enriched nitrogen.

The stream 656 of carbon dioxide is directed to the thermal oxidizer 262 via the ejector 650. The stream 652 of enriched nitrogen exiting the CO2 separation element 650 is heated via the first heat exchanger 205 to produce a heated stream 643 of enriched nitrogen by exchanging heat from the hydrogenated gas stream 622. In some examples (as shown in FIG. 6), the heated stream 643 of enriched nitrogen is further heated via the third heat exchanger 214 to produce a heated stream 645 of enriched nitrogen. The heat exchangers 205, 214 heat the enriched nitrogen to a temperature sufficient for desorption of hydrogen sulfide from the adsorption vessels in their regeneration cycle. The heated second portion 645 of the second byproduct stream is separated into a first regeneration gas stream 644 and a second regeneration gas stream 646, both of which are enriched nitrogen streams.

The first regeneration gas stream 644 (an enriched nitrogen stream) is fed into the first stage adsorption vessel 251, which is undergoing the regeneration cycle, to regenerate the first adsorbent. Desorption occurs in the first stage adsorption vessel 251, where the first adsorbent releases the captured water and the captured relatively small amount of hydrogen sulfide (and optionally trace quantities of carbon dioxide and nitrogen) which are collected via the first byproduct stream 636. The first byproduct stream 636 is routed to the quench tower 206.

For regeneration of the second stage adsorption vessel 256, which is undergoing the regeneration cycle, the second regeneration gas stream 646 (an enriched nitrogen stream) is introduced into the second stage adsorption vessel 256 for regeneration. In the regeneration cycle, hydrogen sulfide is desorbed from the second adsorbent in the second stage adsorption vessel 256, producing a second outlet gas stream 640 containing hydrogen sulfide and at least one of carbon dioxide or nitrogen. The second outlet gas stream 640 is introduced to the reaction furnace 264 of the Claus unit for further processing.

Regeneration of the first stage adsorption vessel 251 and the second stage adsorption vessel 256 using an enriched nitrogen stream can have advantages, e.g., facilitating removal of hydrogen sulfide from the first and second stage adsorption vessels 251, 256, which can result in an improved hydrogen sulfide adsorption capacity during the adsorption cycle.

Figure 7A:
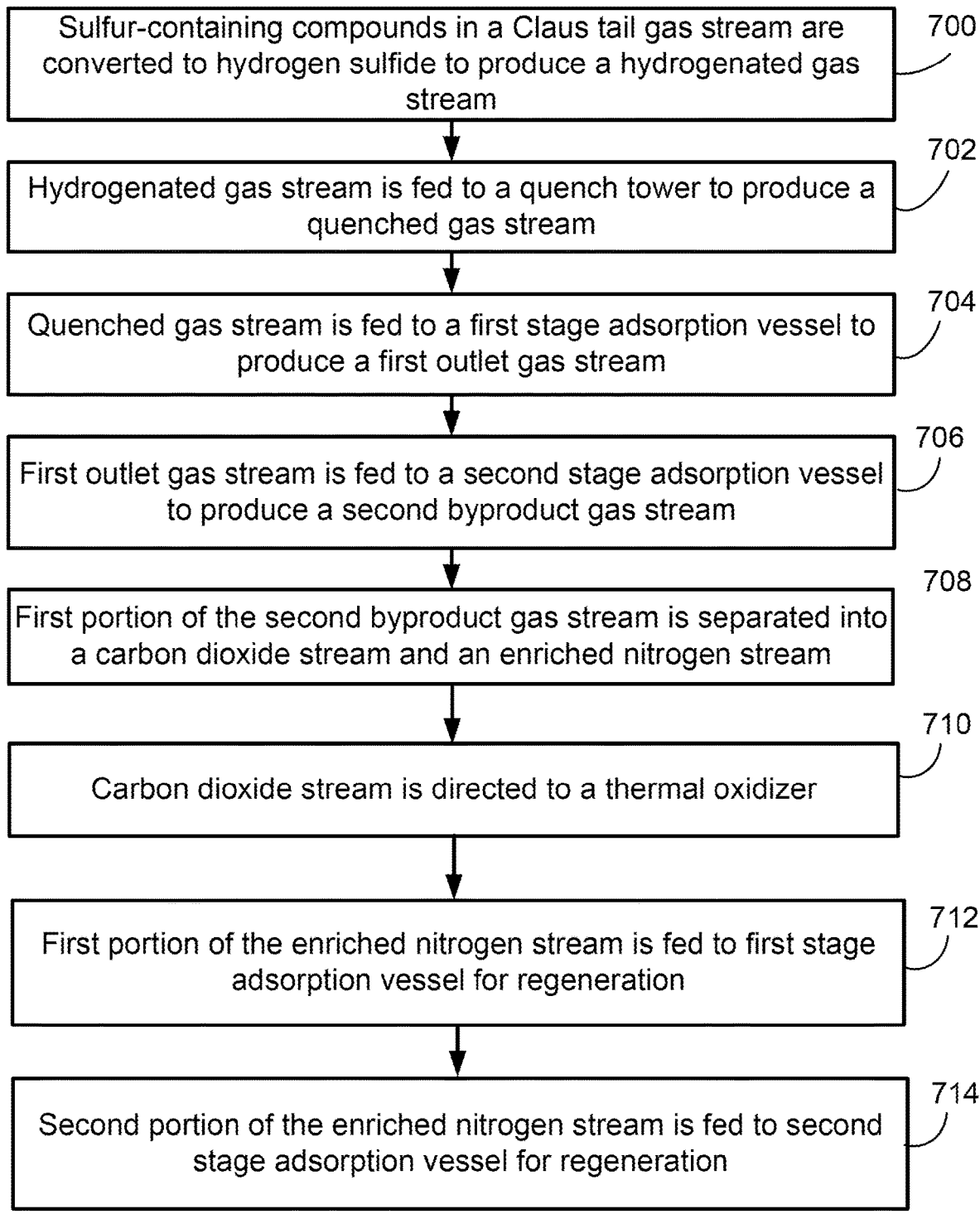
FIGS. 7A and 7B are flow charts.

Referring to FIG. 7A, in an example process for removal of hydrogen sulfide from a Claus tail gas, sulfur-containing compounds in a Claus tail gas stream are converted to hydrogen sulfide in a hydrogenation reactor to produce a hydrogenated gas stream (700). The hydrogenated gas stream contains hydrogen sulfide, water, and at least one of carbon dioxide or nitrogen. The hydrogenated gas stream is fed to a quench tower to produce a quenched gas stream by condensing liquid water into a water condensate stream (702). The quenched gas stream contains hydrogen sulfide, water, and at least one of carbon dioxide or nitrogen.

The quenched gas stream is pressurized in a compressor, cooled, and fed to a first stage adsorption vessel of a first adsorption unit to produce a first outlet gas stream by adsorbing water from the quenched gas stream onto adsorbent of the first stage adsorption vessel (704). In some examples, the cooled, pressurized, quenched gas stream is fed into a collection drum to produce an adsorption feed by recovering liquid water, and the adsorption feed is fed to the first stage adsorption vessel. The first outlet gas stream contains hydrogen sulfide and at least one of carbon dioxide or nitrogen. The first outlet gas stream is fed to a second stage adsorption vessel of a second adsorption unit to produce a second byproduct gas stream by adsorbing hydrogen sulfide onto adsorbent of the second stage adsorption vessel (706). The second byproduct gas stream contains at least one of carbon dioxide or nitrogen.

A first portion of the second byproduct gas stream is separated into a carbon dioxide stream and an enriched nitrogen stream (708). In some examples, the separation of the second portion of the second byproduct gas stream into the nitrogen stream and the carbon dioxide stream is accomplished by application of vacuum to a carbon dioxide separation membrane. In some examples, the separation is accomplished by flowing the carbon dioxide stream to the thermal oxidizer via an ejector. In some examples, the separation is a cryogenic separation process.

The carbon dioxide stream is directed to a thermal oxidizer (710). The enriched nitrogen stream can be heated upstream, e.g., with heat from the hydrogenated gas stream. A first portion of the enriched nitrogen stream is fed to the first stage adsorption vessel for regeneration of the adsorbent in the first stage adsorption vessel by desorption of water from the adsorbent in the first stage adsorption vessel to produce a first byproduct gas stream by desorbing water from the adsorbent in the first stage adsorption vessel (712). The first byproduct gas stream contains at least one of carbon dioxide or nitrogen. In some examples, the first byproduct gas stream is joined with the hydrogenated gas stream that is fed to the quench tower.

A second portion of the enriched nitrogen stream is fed to the second stage adsorption vessel for regeneration of the adsorbent in the second stage adsorption vessel (714). The second portion of the second byproduct gas stream The output from the second stage adsorption vessel during the regeneration cycle is a second outlet gas that contains hydrogen sulfide. The second outlet gas can be fed to a reaction furnace, such as a reaction furnace of a Claus unit that generated the Claus tail gas.

A third portion of the second byproduct gas stream is fed to a thermal oxidizer. In some examples, the first and second portions of the second byproduct gas stream together are a slip stream of the second byproduct gas stream.

Figure 7B:
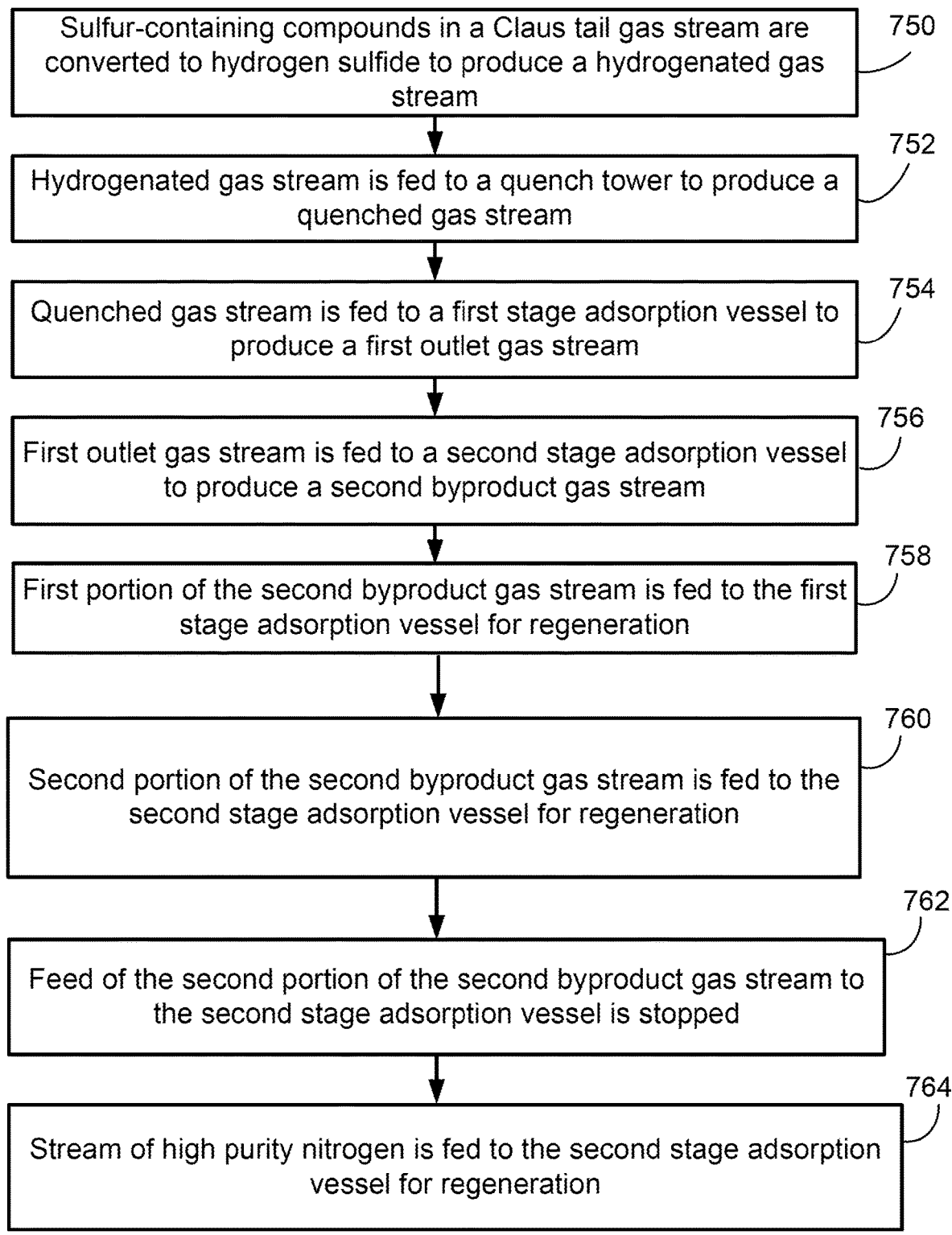

Referring to FIG. 7B, in an example process for removal of hydrogen sulfide from a Claus tail gas, sulfur-containing compounds in a Claus tail gas stream are converted to hydrogen sulfide in a hydrogenation reactor to produce a hydrogenated gas stream (750). The hydrogenated gas stream contains hydrogen sulfide, water, and at least one of carbon dioxide or nitrogen. The hydrogenated gas stream is fed to a quench tower to produce a quenched gas stream by condensing liquid water into a water condensate stream (752). The quenched gas stream contains hydrogen sulfide, water, and at least one of carbon dioxide or nitrogen.

The quenched gas stream is pressurized in a compressor, cooled, and fed to a first stage adsorption vessel of a first adsorption unit to produce a first outlet gas stream by adsorbing water from the quenched gas stream onto adsorbent of the first stage adsorption vessel (754). In some examples, the cooled, pressurized, quenched gas stream is fed into a collection drum to produce an adsorption feed by recovering liquid water, and the adsorption feed is fed to the first stage adsorption vessel. The first outlet gas stream contains hydrogen sulfide and at least one of carbon dioxide or nitrogen. The first outlet gas stream is fed to a second stage adsorption vessel of a second adsorption unit to produce a second byproduct gas stream by adsorbing hydrogen sulfide onto adsorbent of the second stage adsorption vessel (756). The second byproduct gas stream contains at least one of carbon dioxide or nitrogen. The second byproduct gas stream is heated, e.g., with heat from the hydrogenated gas stream.

A first portion of the second byproduct gas stream is fed to the first stage adsorption vessel for regeneration of the adsorbent in the first stage adsorption vessel by desorption of water from the adsorbent in the first stage adsorption vessel to produce a first byproduct gas stream by desorbing water from the adsorbent in the first stage adsorption vessel (758). The first byproduct gas stream contains at least one of carbon dioxide or nitrogen. In some examples, the first byproduct gas stream is joined with the hydrogenated gas stream that is fed to the quench tower.

A second portion of the second byproduct gas stream is fed to the second stage adsorption vessel for regeneration of the adsorbent in the second stage adsorption vessel (760). After a certain amount of time has elapsed, the feed of the second portion of the second byproduct stream to the second stage adsorption vessel is stopped (762) and a stream of high purity nitrogen is fed to the second stage adsorption vessel, e.g., from a cryogenic tank (764). The output from the second stage adsorption vessel during the regeneration cycle is a second outlet gas that contains hydrogen sulfide. The second outlet gas can be fed to a reaction furnace, such as a reaction furnace of a Claus unit that generated the Claus tail gas.

EXAMPLES

Example 1: CuY Zeolite as Second Stage Adsorbent Material

In this example, Y-zeolite, ion-exchanged with Cu ions (referred to as "CuY zeolite" or "CuY"), was used as the adsorbent material for the second stage adsorption cycle, which separates hydrogen sulfide from carbon dioxide. The high polarity of CuY results in a high affinity between the adsorbent material and hydrogen sulfide.

Grand Canonical Monte Carlo (GCMC) simulation techniques were performed to determine the adsorption of hydrogen sulfide on CuY based on the assumption that no chemical processes take place. For the GCMC simulation, regarding the entire system of solid and gas, $6\times10^6$ Monte Carlo steps were performed for the system to reach equilibrium and an additional $6\times10^6$ steps were performed to obtain statistical averages. The simulation was performed under the assumption that no other competitive gases were present in the mixture.

Figure 8:
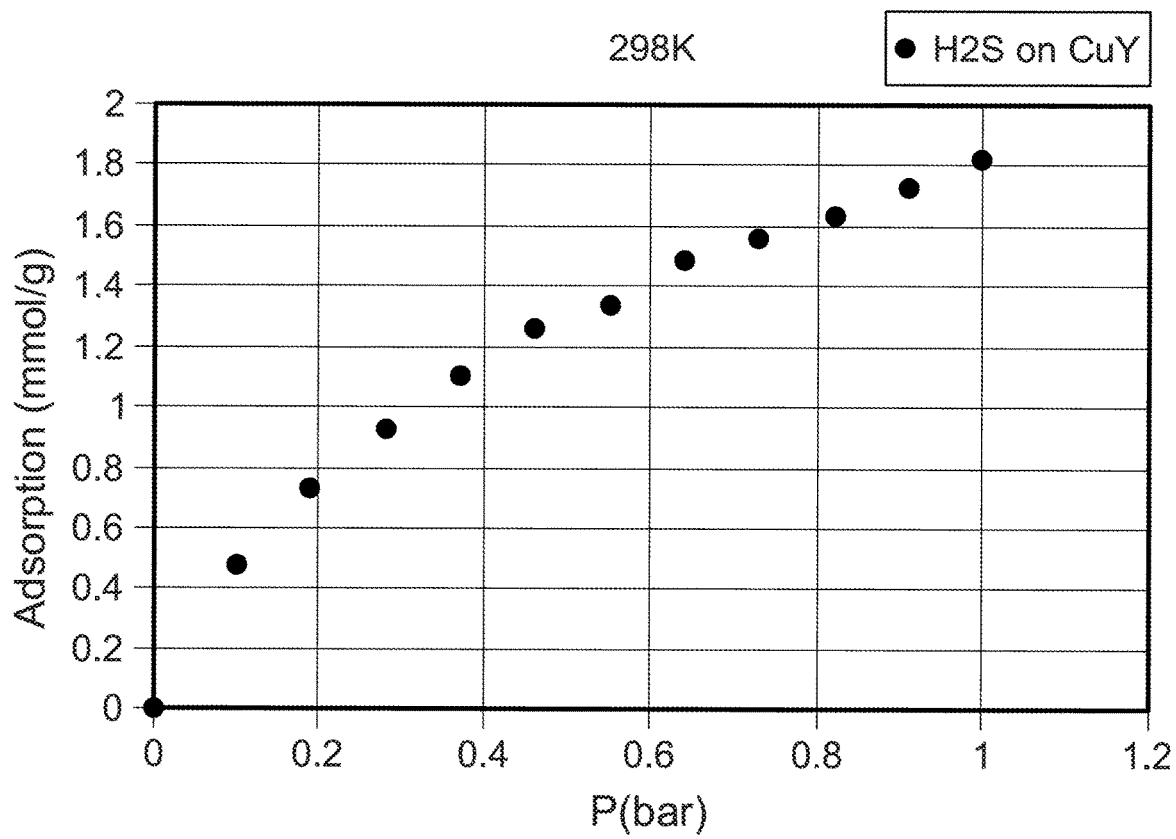
FIG. 8 is a plot of a simulated adsorption isotherm of hydrogen sulfide on Y-zeolite, ion-exchanged with Cu ions ("CuY").

The adsorption capacity (millimoles (mmol) per gram (g), mmol/g) of the adsorbed gas molecules on the system at each thermodynamic point was calculated. The results are shown in FIG. 8. These results show that the adsorption capacity of 1% $H_2S$ on CuY approaches 0.8 mmol/g at 1 barg and 298 Kelvin (K).

Example 2: Simulation of Adsorption Based Tail Gas Treatment Processes

Aspen simulation was performed to determine the Claus tail gas composition of an ultra-lean gas plant (20% H2S acid gas stream) with co-firing and a 3-stage Claus configuration. The acid gas flow was defined at 50 million standard cubic feet per day (MMSCFD). The simulation addressed the adsorption based tail gas treatment processes from the hydrogenation reactor to the water removal stage.

Figure 9:
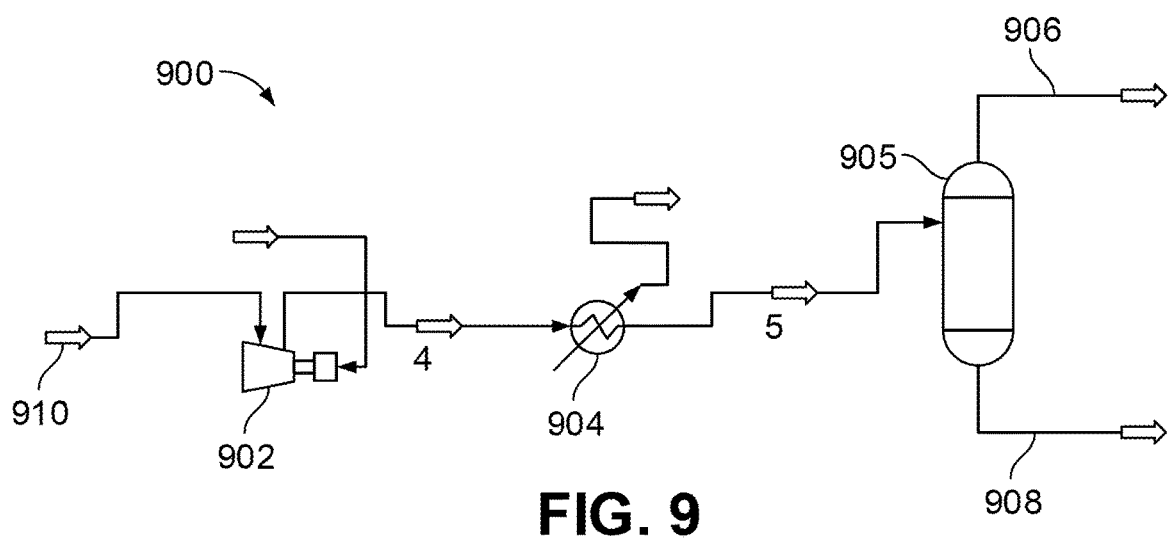
FIGS. 9 and 10 are process diagrams.

FIG. 9 shows a process flow diagram 900 for this simulation. A sulfur recovery unit (SRU) feed stream 910 from a hydrogenation reactor enters a compressor 902, and the compressed gas output from the compressor is fed into a cooler 904. The cooled gas output from the cooler is separated by a separator 905 into a first stream 906 that is directed to water adsorption vessels and a second stream 908 that is directed to a sour water stripper. Table 1 shows the simulated gas composition flow from the SRU feed stream to the water adsorption vessels.

TABLE 1

| Simulated gas flow composition | | | | | | |
|---|---|---|---|---|---|---|
| | SRU feed | | After Hydrogenation Reactor | | To Water Adsorption Vessels | |
| Temperature (F.) | 110 | | 110.2 | | 60 | |
| Pressure (Psig) | 12.00 | | 8.00 | | 43.51 | |
| Phase | VAP | | VAP | | VAP | |
| | lbmol/h | mol % | lbmol/h | mol % | lbmol/h | mol % |
| $CH_4$ | 54.9000 | 1.0000 | — | — | — | — |
| $H_2O$ | 219.6000 | 4.0000 | 988.1350 | 8.6300 | 48.2565 | 0.4591 |
| Hydrogen | — | — | 640.0550 | 5.5900 | 640.1134 | 6.0905 |
| Argon | — | — | 58.3950 | 0.5100 | 58.4003 | 0.5557 |
| Nitrogen | — | — | 4981.8950 | 43.5100 | 4982.3244 | 47.4056 |
| CO | — | — | 13.7400 | 0.1200 | 13.7413 | 0.1307 |
| $CO_2$ | 4117.5000 | 75.0000 | 4703.6500 | 41.0800 | 4703.0795 | 44.7486 |
| $H_2S$ | 1098.0000 | 20.0000 | 64.1200 | 0.5600 | 64.0846 | 0.6097 |
| total flow | 5490.0000 | 100.0000 | 11450.0000 | 100.0000 | 10510.0000 | 100.0000 |

Example 3: Simulation of Adsorption Based Tail Gas Treatment Processes

Aspen simulation of the water removal stage of the tail gas treatment process was performed to determine the size of the adsorption vessels for the specific gas flow and for a 24 hour adsorption cycle.

Figure 10:
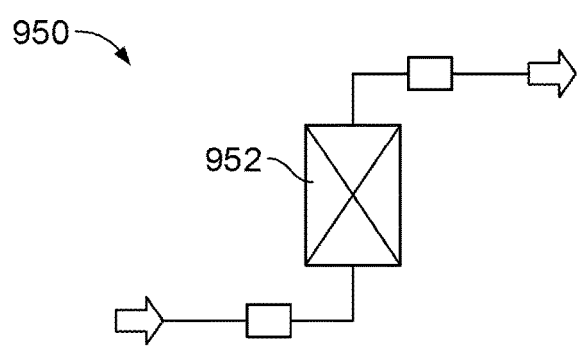

FIG. 10 shows a process flow diagram 950 for this simulation. The first stream 906 (see FIG. 9) from the separator 905 is directed to a water adsorption vessel 952 having molecular sieve 3A as the adsorbent material. The adsorption vessel 952 has a diameter of 3.3 meters (m) and a height of 8.6 m. The adsorption cycle was 24 hours (86400 seconds).

Figure 11:
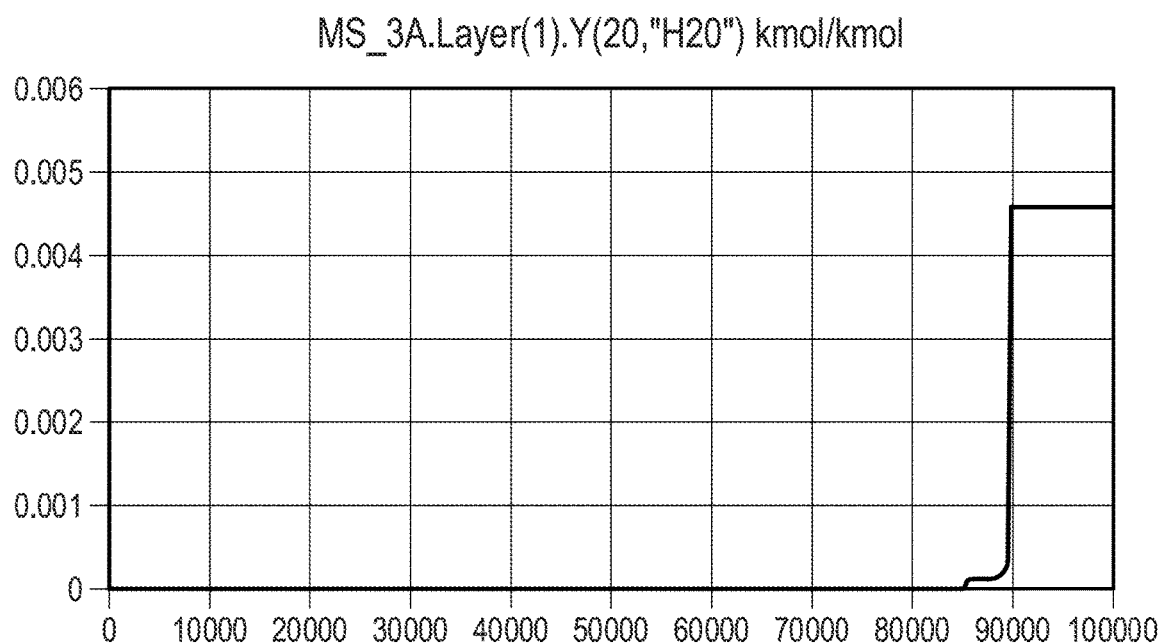
FIG. 11 is a plot of a simulated breakthrough curve of water in a water removal adsorption vessel.

FIG. 11 shows the breakthrough curve of water in the water removal adsorption vessel 952 for the 86400 second adsorption cycle. The y axis label is $mol_{H2O}/mol_{tot}$ (mol of water divided by the total mol of the gas mixture). Table 2 shows the simulated gas composition flow from the separator 905 to the water adsorption vessel 952 (stream S1) and from the water adsorption vessel 952 to a hydrogen sulfide adsorption vessel (stream S2).

TABLE 2

| Simulated gas flow composition | | | | |
|---|---|---|---|---|
| | From Separator (S1) | | From water adsorption vessels (S2) | |
| Temperature (F.) | 60 | | 60 | |
| Pressure (Psig) | 43.51 | | 43.51 | |
| Phase | VAP | | VAP | |
| | lbmol/h | mol % | lbmol/h | mol % |
| $CH_4$ | — | — | — | — |
| $H_2O$ | 48.2565 | 0.4591 | — | — |
| Hydrogen | 640.1134 | 6.0905 | 640.1134 | 6.1186 |
| Argon | 58.4003 | 0.5557 | 58.4003 | 0.5582 |
| Nitrogen | 4982.3244 | 47.4056 | 4982.3244 | 47.6242 |
| CO | 13.7413 | 0.1307 | 13.7413 | 0.1313 |
| $CO_2$ | 4703.0795 | 44.7486 | 4703.0795 | 44.9550 |
| $H_2S$ | 64.0846 | 0.6097 | 64.0846 | 0.6126 |
| total flow | 10510.0000 | 100.0000 | 10461.7435 | 100.0000 |

Example 4: Simulation of Adsorption Based Tail Gas Treatment Processes

Aspen simulation of the hydrogen sulfide removal stage of the tail gas treatment process was performed to determine the size of the adsorption vessels for the specific gas flow and for a 24 hour adsorption cycle.

Figure 12:
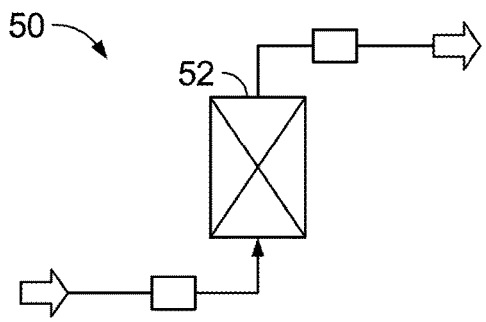
FIG. 12 is a process diagram.

FIG. 12 shows a process flow diagram 50 for this simulation. The stream S1 from the water adsorption vessel 952 (FIG. 10) is directed to a hydrogen sulfide adsorption vessel 52 having CuY zeolite as the adsorbent material. The adsorption vessel 52 has a diameter of 4.63 meters (m) and a height of 12.1 m. The adsorption cycle was 24 hours (86,400 seconds).

Figure 13A:
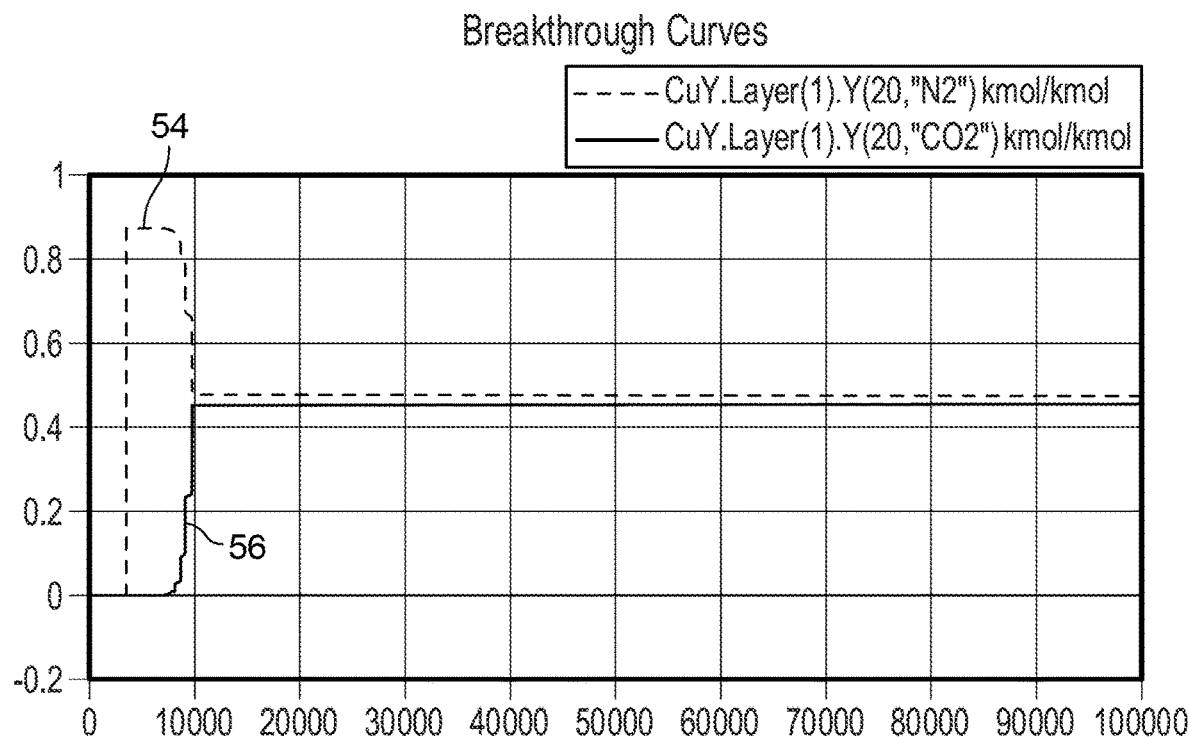
FIG. 13A is a plot of simulated breakthrough curves of carbon dioxide and nitrogen in a hydrogen sulfide removal adsorption vessel.
Figure 13B:
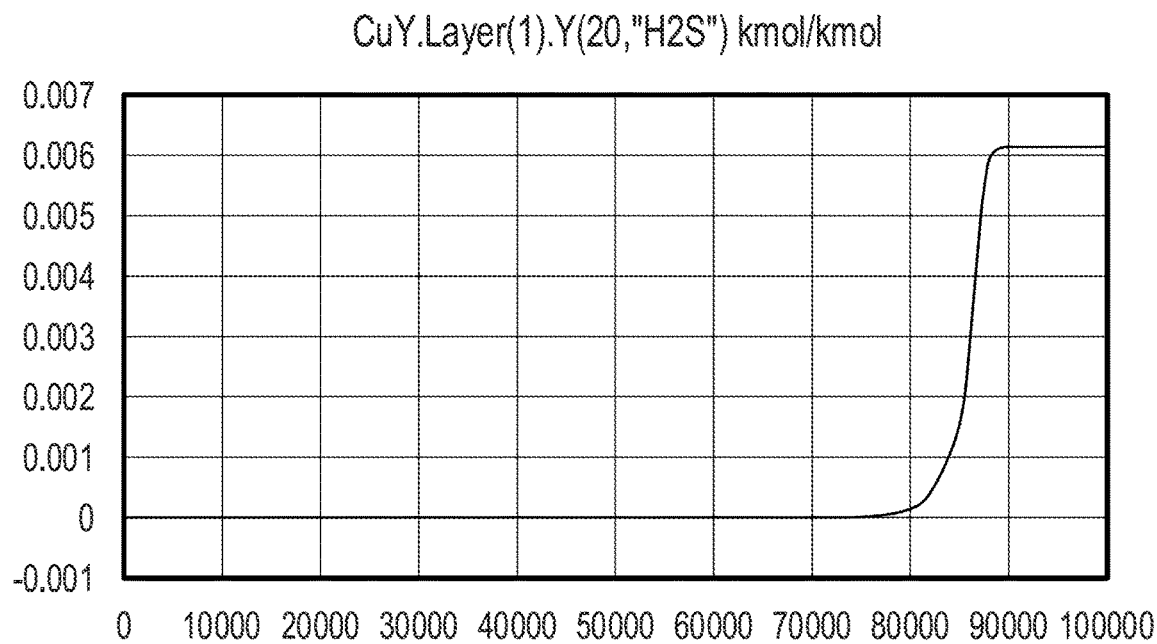
FIG. 13B is a plot of a simulated breakthrough curve of hydrogen sulfide in a hydrogen sulfide removal adsorption vessel.

FIG. 13A shows the breakthrough curves of nitrogen (curve 54) and carbon dioxide (curve 56) in the hydrogen sulfide adsorption vessel 52 for the 86,400 second adsorption cycle. FIG. 13B shows the breakthrough curve of hydrogen sulfide in the hydrogen sulfide adsorption vessel 52. The y axis label for FIGS. 13A and 13B is $mol_{H2O}/mol_{tot}$ (mol of water divided by the total mol of the gas mixture). Table 3 shows the simulated gas composition flow from the water adsorption vessel 952 to the hydrogen sulfide adsorption vessel 52 (stream S3) and from the hydrogen sulfide adsorption vessel 52 to a thermal oxidizer and/or as a regeneration slip stream (stream S4).

TABLE 3

| Simulated gas flow composition | | | | |
|---|---|---|---|---|
| | From Water Removal stage (S3) | | From H2S adsorption vessels (S4) | |
| Temperature (F.) | 60 | | 60 | |
| Pressure (Psig) | 43.51 | | 8.00 | |
| Phase | VAP | | VAP | |
| | lbmol/h | mol % | lbmol/h | mol % |
| $CH_4$ | — | — | — | — |
| $H_2O$ | — | — | — | — |
| Hydrogen | 640.1134 | 6.1186 | 640.1134 | 6.4132 |
| Argon | 58.4003 | 0.5582 | 58.4003 | 0.5851 |
| Nitrogen | 4382.3244 | 47.6242 | 4886.1984 | 48.9544 |

TABLE 3-continued

| Simulated gas flow composition | | | |
|---|---|---|---|
| CO | 13.7413 | 0.1313 | 13.7413 | 0.1377 |
| $CO_2$ | 4703.0795 | 44.9550 | 4382.6564 | 43.9095 |
| $H_2S$ | 64.0846 | 0.6126 | — | — |
| total flow | 10461.7435 | 100.0000 | 9981.1098 | 100.0000 |

Particular embodiments of the subject matter have been described. Other embodiments are within the scope of the following claims.

What is claimed is:

1. A method for sulfur recovery, the method comprising:
in a hydrogenation reactor, converting sulfur-containing compounds in a Claus tail gas stream to hydrogen sulfide to produce a hydrogenated gas stream comprising hydrogen sulfide, water, and at least one of carbon dioxide or nitrogen;
feeding the hydrogenated gas stream to a quench tower to produce a quenched gas stream by condensing liquid water into a water condensate stream;
feeding the quenched gas stream to a first stage adsorption vessel of a first stage adsorption unit to produce a first outlet gas stream by adsorbing water from the quenched gas stream;
feeding the first outlet gas stream to a second stage adsorption vessel of a second stage adsorption unit to produce a second byproduct gas stream by adsorbing hydrogen sulfide from the first outlet gas stream;
separating at least a portion of the second byproduct gas stream into a carbon dioxide stream and an enriched nitrogen stream; and
regenerating the second stage adsorption vessel by feeding a portion of the enriched nitrogen stream to the second stage adsorption vessel to produce a second outlet gas stream.

2. The method of claim 1, comprising separating the first portion of the second byproduct gas stream into the carbon dioxide stream and the enriched nitrogen stream using cryogenic separation.

3. The method of claim 1, comprising separating the first portion of the second byproduct gas stream into the carbon dioxide stream and the enriched nitrogen stream using a separation membrane.

4. The method of claim 3, comprising applying vacuum to the separation membrane.

5. The method of claim 1, comprising feeding the carbon dioxide stream to a thermal oxidizer.

6. The method of claim 5, comprising feeding the carbon dioxide stream to the thermal oxidizer via an ejector.

7. The method of claim 1, comprising regenerating the first stage adsorption vessel by feeding a first portion of the enriched nitrogen stream to the first stage adsorption vessel to produce a first byproduct gas stream by desorbing water.

8. The method of claim 7, comprising joining the first byproduct gas stream with the hydrogenated gas stream to form a joined stream and feeding the joined stream to the quench tower.

9. The method of claim 1, comprising heating the enriched nitrogen stream in a heat exchanger with heat from the hydrogenated gas stream.

10. The method of claim 1, comprising pressurizing the quenched gas stream in a compressor; and cooling the pressurized quenched gas stream.

11. The method of claim 1, comprising feeding the quenched gas stream to a collection drum to produce an adsorption feed by recovering liquid water via a second water condensate stream, in which the adsorption feed is fed to the first stage adsorption vessel.

12. The method of claim 1, comprising feeding the water condensate stream to a sour water stripper.

13. The method of claim 1, comprising feeding a second portion of the second byproduct gas stream to a thermal oxidizer.

14. The method of claim 1, comprising feeding the second outlet gas to a reaction furnace.

15. A system for sulfur recovery from Claus tail gas, the system comprising:
a hydrogenation reactor configured to convert sulfur-containing compounds in a Claus tail gas stream to hydrogen sulfide to produce a hydrogenated gas stream;
a quench tower fluidically connected to the hydrogenation reactor and configured to receive the hydrogenated gas stream and produce a quenched gas stream by condensing liquid water into a water condensate stream;
a first stage adsorption unit comprising a first stage adsorption vessel that, during a first stage adsorption cycle, is fluidically connected to the quench tower and configured to receive the quenched gas stream and to produce a first outlet gas stream by adsorbing water from the quenched gas stream;
a second stage adsorption unit comprising a second stage adsorption vessel that, during a second stage adsorption cycle, is fluidically connected to the first stage adsorption vessel and configured to receive the first outlet gas stream and to produce a second byproduct gas stream by adsorbing hydrogen sulfide from the first outlet gas stream;
a carbon dioxide separation element configured to receive at least a portion of the second byproduct gas stream and to separate the portion of the second byproduct gas stream into a carbon dioxide stream and an enriched nitrogen stream;
in which the second stage adsorption vessel, during a second stage regeneration cycle, is configured to receive a portion of the enriched nitrogen stream.

16. The system of claim 15, in which the carbon dioxide separation element comprises a separation membrane configured to separate the portion of the second byproduct gas stream into the carbon dioxide stream and the enriched nitrogen stream.

17. The system of claim 15, in which the carbon dioxide separation element comprises a cryogenic separation element.

18. The system of claim 15, comprising a thermal oxidizer configured to receive the carbon dioxide stream.

19. The system of claim 18, comprising an ejector, in which the thermal oxidizer is configured to receive the carbon dioxide stream from the ejector.

20. The system of claim 15, in which the first stage adsorption vessel, during a first stage regeneration cycle, is configured to receive a first portion of the enriched nitrogen stream and to produce a first byproduct gas stream by desorbing water.

21. The system of claim 15, comprising a thermal oxidizer configured to receive a second portion of the second byproduct gas stream.

22. The system of claim 15, comprising a reaction furnace fluidically connected to the second stage adsorption vessel and configured to receive a second outlet gas produced in the second stage adsorption unit during the second stage regeneration cycle.

23. The system of claim 15, comprising a heat exchanger configured to cool the hydrogenated gas stream with heat from the enriched nitrogen stream.

24. The system of claim 15, in which the first stage adsorption vessel comprises a hydrophilic molecular sieve.

25. The system of claim 15, in which the second stage adsorption vessel comprises a Cu—Y type zeolite.

26. The system of claim 15, in which the first stage adsorption unit comprises multiple first stage adsorption vessels fluidically connected in parallel, and in which the second stage adsorption unit comprises multiple second stage adsorption vessels fluidically connected in parallel.

27. A method for sulfur recovery, the method comprising:
in a hydrogenation reactor, converting sulfur-containing compounds in a Claus tail gas stream to hydrogen sulfide to produce a hydrogenated gas stream comprising hydrogen sulfide, water, and at least one of carbon dioxide or nitrogen;
feeding the hydrogenated gas stream to a quench tower to produce a quenched gas stream by condensing liquid water into a water condensate stream;
feeding the quenched gas stream to a first stage adsorption vessel of a first stage adsorption unit to produce a first outlet gas stream by adsorbing water from the quenched gas stream;
feeding the first outlet gas stream to a second stage adsorption vessel of a second stage adsorption unit to produce a second byproduct gas stream by adsorbing hydrogen sulfide from the first outlet gas stream; and
regenerating the second stage adsorption vessel to produce a second outlet gas stream, in which regenerating the second stage adsorption vessel comprises feeding a portion of the second byproduct gas stream and a stream of nitrogen to the second stage adsorption vessel.

28. The method of claim 27, in which regenerating the second stage adsorption vessel comprises feeding the stream of nitrogen to the second stage adsorption vessel from a cryogenic tank.

29. The method of claim 27, in which regenerating the second stage adsorption vessel comprises:
feeding the portion of the second byproduct gas stream to the second stage adsorption vessel for a first period of time; and
feeding the stream of nitrogen gas to the second stage adsorption vessel for a second period of time following the first period of time.

* * * * *